United States Patent
Panz et al.

(10) Patent No.: US 7,985,292 B2
(45) Date of Patent: Jul. 26, 2011

(54) PRECIPITATED SILICA FOR THICKENING AND CREATING THIXOTROPIC BEHAVIOR IN LIQUID SYSTEMS

(75) Inventors: Christian Panz, Wesseling-Berzdorf (DE); Karl Meier, Alfter (DE); James Toth, Jersey City, NY (US); Guido Titz, Heimbach (DE); Matt Romaine, Franklin Park, NJ (US); Mario Scholz, Gruendau (DE)

(73) Assignee: Evonik Degussa Corporation, Parsippany, NJ (US)

( * ) Notice: Subject to any disclaimer, the term of this patent is extended or adjusted under 35 U.S.C. 154(b) by 299 days.

(21) Appl. No.: 11/944,851

(22) Filed: Nov. 26, 2007

(65) Prior Publication Data

US 2009/0136672 A1  May 28, 2009

(51) Int. Cl.
*C04B 28/26* (2006.01)
*B05D 3/00* (2006.01)
*B60C 1/00* (2006.01)
*C08K 3/34* (2006.01)
*B02C 19/06* (2006.01)
*B02C 19/00* (2006.01)
*B32B 9/04* (2006.01)
*B32B 5/16* (2006.01)

(52) U.S. Cl. ............... 106/287.34; 427/397.7; 524/493; 241/5; 241/23; 428/331; 428/446

(58) Field of Classification Search ............... 427/397.7, 427/372.2; 423/339; 241/16, 23, 5; 106/287.24, 106/287.34; 524/492–493; 428/331, 446
See application file for complete search history.

(56) References Cited

U.S. PATENT DOCUMENTS

| | | | |
|---|---|---|---|
| 4,497,918 A * | 2/1985 | Wason | 523/220 |
| 5,256,196 A | 10/1993 | Chjonowski et al. | |
| 5,321,070 A | 6/1994 | Meier et al. | |
| 5,747,003 A * | 5/1998 | Mohnot et al. | 424/49 |
| 5,851,502 A | 12/1998 | Turk et al. | |
| 6,077,466 A | 6/2000 | Turk et al. | |
| 6,191,122 B1 | 2/2001 | Lux et al. | |
| 6,846,865 B2 | 1/2005 | Panz et al. | |
| 6,899,951 B2 | 5/2005 | Panz et al. | |
| 6,956,080 B2 | 10/2005 | Scholz et al. | |
| 7,022,375 B2 | 4/2006 | Schachtely et al. | |
| 7,074,457 B2 | 7/2006 | Panz et al. | |
| 7,204,969 B2 | 4/2007 | Kuhlmann et al. | |
| 7,220,449 B2 | 5/2007 | Schachtely et al. | |
| 2002/0112647 A1* | 8/2002 | Lindner et al. | 106/482 |
| 2003/0114571 A1* | 6/2003 | Pan | 524/492 |
| 2005/0107520 A1* | 5/2005 | Gottschalk-Gaudig et al. | 524/556 |

(Continued)

OTHER PUBLICATIONS

U.S. Appl. No. 12/262,684, filed Oct. 31, 2008, Panz, et al.

(Continued)

*Primary Examiner* — Anthony J Green
*Assistant Examiner* — Pegah Parvini
(74) *Attorney, Agent, or Firm* — Oblon, Spivak, McClelland, Maier & Neustadt, L.L.P.

(57) ABSTRACT

A precipitated silica having a $d_{50}$-value of from 150 to 2000 nm, a $d_{90}$-value of from 500 to 7000 nm, a silanol group density of from 2.5 to 8 OH/nm$^2$, and a modified tapped density of less than or equal to 70 g/l is useful for thickening and providing thixotropy in liquid systems and shows superior efficiency at thickening and creating thixotropy compared to existing grades of precipitated silica. The precipitated silica functions best as a thixotrope in non-polar or intermediate polar liquid systems such as unsaturated polyester (UPE) resin systems.

22 Claims, 6 Drawing Sheets

U.S. PATENT DOCUMENTS

2005/0191228 A1  9/2005  Panz et al.
2005/0192395 A1  9/2005  Panz et al.
2005/0282934 A1  12/2005  Brinkmann et al.
2007/0286788 A1  12/2007  Panz et al.
2007/0299203 A1  12/2007  Panz et al.
2008/0173739 A1  7/2008  Meier et al.
2008/0261024 A1*  10/2008  Xenopoulos et al. ......... 428/331

OTHER PUBLICATIONS

U.S. Appl. No. 60/021,601, filed Jul. 11, 1996, Oelmueller, et al.
U.S. Appl. No. 09/447,044, filed Nov. 23, 1999, Turk, et al.
U.S. Appl. No. 08/683,342, filed Jul. 18, 1996, Rausch, et al.
U.S. Appl. No. 60/940,615, filed May 29, 2007, Meier, et al.
U.S. Appl. No. 60/985,809, filed Nov. 6, 2007, Panz, et al.

* cited by examiner

PRECIPITATED SILICA FOR THICKENING AND CREATING THIXOTROPIC BEHAVIOR IN LIQUID SYSTEMS

BACKGROUND OF THE INVENTION

1. Field of the Invention

This invention relates to new precipitated silica for thickening and providing thixotropy in liquid systems and to a process for their manufacture. The new precipitated silica shows superior efficiency at thickening and creating thixotropy compared to existing grades of precipitated silica. The new precipitated silica functions well as a thixotrope in nonpolar or intermediate polar liquid systems such as unsaturated polyester (UPE) resin systems.

2. Discussion of the Background

Hydrophilic fumed and precipitated silica is well known to thicken and create thixotropy in liquid systems. The rheological effects are based on the formation of hydrogen bonding between silanol groups on adjacent silica particles. Hydrophilic silica has the greatest thickening and thixotropic effect in non-polar liquids, i.e., liquids that have a low amount of inherent hydrogen bonding. Inherent hydrogen bonding of a liquid medium can interfere with the hydrogen bonding between silanol groups of the silica and reduce the thickening effect. In intermediate polarity systems such as some epoxies, the thickening effect is still quite strong. However, in highly polar systems such as low molecular weight (mw) alcohols, hydrophilic silica is very ineffective at thickening and creating thixotropy. Examples of liquid systems where hydrophilic silica can be best utilized include aliphatic hydrocarbons, aromatic hydrocarbons, chlorinated solvents, fluorocarbons, mineral oils, terpenes, oil modified alkyds, epoxies, high mw esters, high mw ethers, glycol ether esters, unsaturated polyesters, silicones, vegetable oils, and vinyls. In some cases, hydrophilic silica could also possibly be used in even higher polarity systems such as high mw alcohols, high mw aldehydes, alkyds, high mw amides, high mw amines, glycol ethers, polyurethanes, vinyl esters, and thiols.

Unsaturated polyester resin systems are one the most common and important liquid resin systems thickened by hydrophilic silica. Unsaturated polyester compositions which are condensation polymers based on glycols and dibasic acids are used in a multitude of applications. These unsaturated polyester resins are essentially Newtonian in nature, that is, their viscosity is not shear dependent. In many of the applications of such resins, the resin must not drain from vertical surfaces before cure and must possess other properties of acceptable thixotropic character, which means that the resin should exhibit high apparent viscosity at low shear and much lower viscosity at high shear, and must also not drain from a vertical surface before cure.

Thixotropic polyester resins and gel coats are widely used in the marine industry as fiberglass reinforced plastics for boat building. Other typical applications for thixotropic resins include corrosion-resistant products, electrical components, tub and shower, wind mills and transportation. See "Modern Plastics Encyclopedia", 1977-1978, p. 65-66; and 1978-1979, p. 56-59. These are special fields in which thixotropic resins must be used which meet the requirements set forth above for thixotropic character (see Connolly, "Modern Plastics Encyclopedia", 1975-1976, p. 61-62).

The use of fumed silica in thixotropic unsaturated polyester (UPE) resins, is an old and very well known technology. Precipitated silica has also been utilized from at least the early 1980's. In 1985, the J. M. Huber Corporation was granted a U.S. Pat. No. 4,497,918 for utilizing combinations of precipitated and fumed silica in thixotropic unsaturated polyester formulations. Similar marine gel coats are disclosed in US 200710001343.

Compared to typical precipitated silica, fumed silica is more efficient at adding viscosity, is more thixotropic, provides better suspension stability in low viscosity resins and leads to better clarity. On the other hand advantages of precipitated silica compared to fumed silica include faster and shear independent dispersion, lower cost, better leveling of the coating or casting, less porosity in gel coats and in some cases less viscosity drift. As consequence in many cases, a blend of fumed and precipitated silica is utilized to achieve the benefits of both silica types. This, however, is often not an acceptable situation for manufacturers of unsaturated polyesters because two different kinds of silica have to be purchased and stored, which causes the need of two different storing devices. In addition, it is still necessary to use at least partly fumed silica having a much higher price compared to precipitated silica.

In summary, therefore, it can be stated that there is a strong need for new fillers for liquid systems, preferably unpolar and intermediate-polar systems, particular preferably UPE formulations, suitable to reduce costs, improve application properties and to simplify the production process.

SUMMARY OF THE INVENTION

One problem underlying the present invention was to provide new fillers for liquid systems, preferably unpolar and intermediate-polar systems, particular preferably UPE formulations, from which the above mentioned disadvantages of the compositions of the state of the art are completely or at least partially eliminated.

A further aim was to provide a process for preparing such fillers. Another aim was to provide new liquid compositions, preferably unpolar and intermediate-polar systems, particular preferably UPE formulations.

Further problems not explicitly mentioned can be derived easily from the description, claims and examples of the present invention.

It has now surprisingly been found by the inventors, that these problems can be solved by precipitated silica as described herein and having a $d_{50}$-value of from 150 to 2000 nm a $d_{90}$-value of from 500 to 7000 nm a silanol group density of from 2.5 to 8 OH/nm$^2$ and a modified tapped density less than or equal to 70 g/l.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

DETAILED DESCRIPTION OF THE INVENTION

Figure 1:
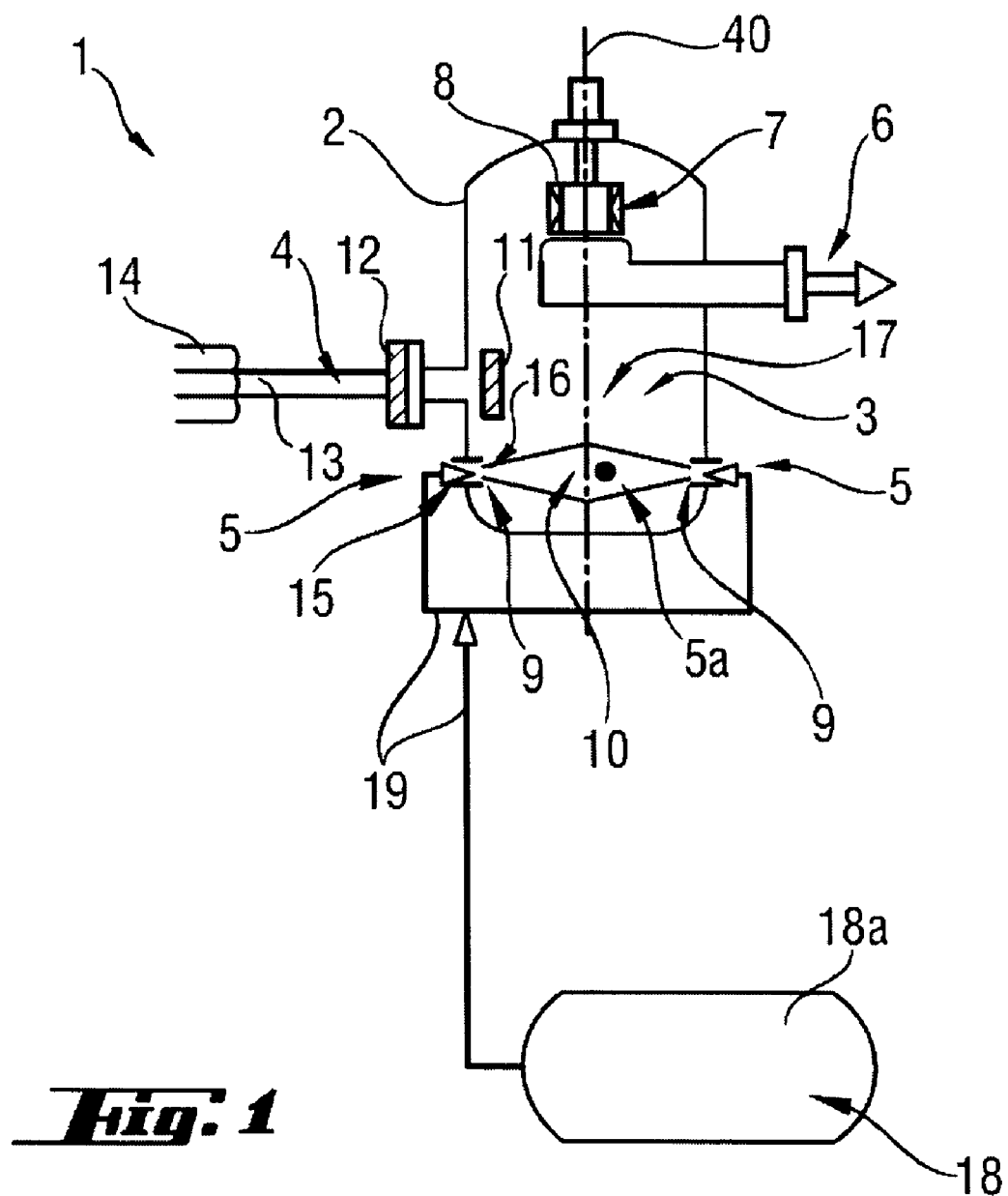
FIG. 1 shows a fluid-bed opposed-jet mill.

A first embodiment of the present invention is a precipitated silica, having
- a $d_{50}$-value of from 150 to 2000 nm,
- a $d_{90}$-value of from 500 to 7000 nm,
- a silanol group density of from 2.5 to 8 $OH/nm^2$, and
- a modified tapped density less than or equal to 70 g/l.

The $d_{50}$-value includes all values and subvalues therebetween, especially including 200, 300, 400, 500, 600, 700, 800, 900, 1000, 1100, 1200, 1300, 1400, 1500, 1600, 1700, 1800 and 1900 nm. The $d_{90}$-value includes all values and subvalues therebetween, especially including 1000, 1500, 2000, 2500, 3000, 3500, 4000, 4500, 5000, 5500, 6000 and 6500 nm. The silanol group density includes all values and subvalues therebetween, especially including 2.6, 2.7, 2.8, 2.9, 3.0, 3.5, 4, 4.5, 5, 5.5, 6, 6.5, 7 and 7.5 $OH/nm^2$. The modified tapped density includes all values and subvalues therebetween, especially including 0, 0.5, 1, 5, 10, 20, 30, 40, 50 and 60 g/l.

The present invention also provides precipitated silica which in addition to the above-stated parameters, independently of one another, have one or more of the following physicochemical parameters:
- a BET surface area of from 100 to 350 $m^2/g$,
- a loss on drying of from 1.5 to 8% by weight,
- a loss on ignition of from 1.5 to 9% by weight, and
- an $SiOH_{isolated}$ absorbance ratio of less than or equal to 0.8.

The BET surface area includes all values and subvalues therebetween, especially including 120, 140, 150, 160, 180, 200, 220, 240, 250, 260, 280, 300, 320 and 340 $m^2/g$. The loss on drying includes all values and subvalues therebetween, especially including 2, 2.5, 3, 3.5, 4, 4.5, 5, 5.5, 6, 6.5, 7 and 7.5% by weight. The a loss on ignition includes all values and subvalues therebetween, especially including 2, 2.5, 3, 3.5, 4, 4.5, 5, 5.5, 6, 6.5, 7, 7.5, 8 and 8.5% by weight. The $SiOH_{isolated}$ absorbance ratio includes all values and subvalues therebetween, especially including 0, 0.1, 0.2, 0.3, 0.4, 0.5, 0.6, 0.7.

The present invention also provides precipitated silica which in addition to the above-stated parameters, has a surface which is doped with at least one bivalent cation for example $Mg^{2+}$, $Ca^{2+}$, $Sr^{2+}$, $Ba^{2+}$ and $Zn^{2+}$ and/or one trivalent cation for example $Al^{3+}$ and/or optionally treated with a base to adapt pH value for example $NH_3$, NaOH, or $Ca(OH)_2$. In a special embodiment the precipitated silica can be treated with an agent comprising which contain a bivalent cation and a base.

The present invention further provides a process for preparing precipitated silica of the invention, wherein a precipitated silica having
- a Sears number of from 10 to 30 ml/(5 g),
- a BET-surface of from 100 to 350 $m^2/g$,
- a loss on drying of from 2 to 8% by weight,
- a loss on ignition of from 2 to 9% by weight,
- a pH-value of from 4 to 9, and
- a DBP-value of from 230 g/100 g to 400, preferably of from 250 to 350 g/100 g, is milled and simultaneously classified using a grinding system (grinding apparatus), with particular preference a grinding system comprising a jet mill, characterized in that the mill of the grinding system is operated in the grinding phase with an operational medium selected from the group consisting of gas and/or vapor, preferably steam, and/or a gas comprising steam, and in that the grinding chamber is heated in a heating phase, i.e. before the actual operation with the operational medium, such that the temperature in the grinding chamber and/or at the mill outlet is higher than the dew point of the vapor and/or operational medium and in that the milled silica is classified to a $d_{50}$-value of from 150-2000 nm and a $d_{90}$-value of from 500-7000 nm.

The Sears number includes all values and subvalues therebetween, especially including 15, 20 and 25 ml/(5 g). The BET surface area includes all values and subvalues therebetween, especially including 120, 140, 150, 160, 180, 200, 220, 240, 250, 260, 280, 300, 320 and 340 $m^2/g$. The loss on drying includes all values and subvalues therebetween, especially including 2, 2.5, 3, 3.5, 4, 4.5, 5, 5.5, 6, 6.5, 7 and 7.5% by weight. The a loss on ignition includes all values and subvalues therebetween, especially including 2, 2.5, 3, 3.5, 4, 4.5, 5, 5.5, 6, 6.5, 7, 7.5, 8 and 8.5% by weight. The pH-value includes all values and subvalues therebetween, especially including 4.5, 5, 5.5, 6, 6.5, 7, 7.5, 8 and 8.5.

The DBP-value includes all values and subvalues therebetween, especially including 2250, 260, 280, 300, 320, 340, 350, 360, 380 g/100 g.

The $d_{50}$-value includes all values and subvalues therebetween, especially including 200, 300, 400, 500, 600, 700, 800, 900, 1000, 1100, 1200, 1300, 1400, 1500, 1600, 1700, 1800 and 1900 nm. The $d_{90}$-value includes all values and subvalues therebetween, especially including 1000, 1500, 2000, 2500, 3000, 3500, 4000, 4500, 5000, 5500, 6000 and 6500 nm.

The present invention also provides a process for thickening of liquid compositions, preferably unpolar and intermediate-polar systems, particular preferably UPE formulations characterized by combining at least on precipitated silica of the invention with at least one polymer.

The present invention also provides liquid systems, preferably unpolar polymer compositions comprising at least on precipitated silica of the invention. Examples for said liquid compositions are unpolar adhesives, plastisols, epoxy resins, vinyl resins and very particular unsaturated polyester resins.

The present invention further provides products/articles coated with liquid compositions, preferably unpolar and intermediate-polar systems, particular preferably UPE formulations of the present invention, and methods for coating articles with invention UPE compositions.

The precipitated silica of the invention show several advantages compared to silica known in the prior art. Compared to precipitated silica conventionally used in UPE formulations, like Sipernat 22 LS from Evonik Degussa GmbH, the silica of the present invention show a significantly improved sedimentation stability and a significantly improved thickening behavior. Without being tied to a special theory, applicants or of the opinion, that the special combination of a fluffy structure in combination with the high silanol group density is responsible for said effects. The small particle, i.e. $d_{50}$ value and the $d_{90}$ value, are believed to cause the dispersion stability while the high silanol group density leads to good thickening properties and rheology.

Another advantage is, that the new silicas allow to generate a high thixotropy in unpolar and intermediate-polar liquid formulations without simultaneously adding too much viscosity. In particular it is believed, that the low modified tapped density of the precipitated silicas of the present invention is important for a very good thixotropy. It should be noted here that the modified tapped density is a reference to the tapped density as measured on the uncompacted material. In order to be able to determine this variable even on materials which have already undergone preliminary compaction as a result of packaging and storage, it is necessary to carry out sample preparation as described in the section "Determining the modified tapped density". The silicas of the present invention have a low modified tapped density, i.e. a "fluffy structure".

A further advantage of the precipitated silica of the invention is that the polymer compositions comprising said silica exhibit improved deaeration properties.

Extraordinary viscosity and thixotropy of the UPE composition can be achieved by doping the surface of the silica with multivalent cations and/or $NH_3$. Without being tied to a special theory applicants believe, that the multivalent cations bridging silanol groups and silanolate groups of the precipitated silica particles among each other and with the carboxylate groups of the UPE.

Another important advantage is that the UPE compositions of the invention show excellent application performance without the need to use a mix of precipitated and fumed silica. In other words one of the key problems that has been solved is that it is now possible to use only one filler, i.e. the precipitated silica described above, or at least to reduce the amount of pyrogenic silica significantly and thus to reduce the cost of the formulation significantly.

The terms unsaturated polyester composition and UPE are used synonymously herein. Analogue gel coat(s), gel coating composition(s) and gel coat composition(s) are used synonymously herein.

In a first embodiment of the invention precipitated silica having the following physico chemical properties: precipitated silica as described herein and having
- a $d_{50}$-value of from 150 to 2000 nm, preferably of from 200 to 1500 nm, more preferably of from 250 to 1200 nm, most preferably of from 300 to 900 nm and particular preferred of from 350 to 600 nm;
- a $d_{90}$-value of from 500 to 7000 nm, preferably of from 700 to 6500 nm, more preferably of from 800 to 6000 nm, most preferably of from 900 to 6000 nm and particular preferred of from 1000 to 5000 nm;
- and a silanol group density of from 2.5 to 8 $OH/nm^2$, preferably of from 2.6 to 7 $OH/nm^2$, more preferably of from 2.7 to 6 $OH/nm^2$, most preferably of from 2.8 to 5.5 $OH/nm^2$ and particular preferred of from 3.1 to 5 $nm^2$
- and a modified tapped density of less than or equal to 70 g/l, preferably of 1 to 60 g/l, more preferably of 5 to 55 g/l, very preferably of 10 to 50 g/l, and in particular of 10 to 30 g/l. The modified tapped density includes all values and subvalues therebetween, especially including 5, 10, 15, 20, 25, 30, 35, 40, 45, 50, 55, 60 and 65 g/l.

are provided.

To achieve good thickening effect and thixotropy it has been found advantageous, if—beside of the small particle size and the low modified tapped density—the precipitated silica of the invention have a BET surface area of from 100 to 350 $m^2/g$. and an $SiOH_{isolated}$ absorbance ratio of less than or equal to 0.8.

A parameter characterizing the porosity and thus the thickening properties of the precipitated silica used in the UPE is the BET surface area. The BET surface area of the silica used in the UPE of the invention is preferably of from 100 to 350 $m^2/g$, more preferably 110 to 340 $m^2/g$, most preferably 120 to 330 $m^2/g$, especially preferred 130 to 300 $m^2/g$ and very particular preferred 145 to 280 $m^2/g$.

The chemical structure of the silica surface also has an influence on the thickening properties. It has surprisingly been found, that the effect of the high silanol group density of the silica of the invention can be multiplied, if there are less isolated Silanolgroups on the silica surface. In a preferred embodiment of the invention, the precipitated silicas of the present invention are distinguished by the fact that they have a particularly low proportion of isolated SiOH groups, as expressed by the $SiOH_{isolated}$ absorbance ratio, on their surface. The $SiOH_{isolated}$ absorbance ratio of the silicas of the present invention is less than or equal to 0.8, preferably between 0.75 and 0.01, more preferably between 0.7 and 0.01, very preferably between 0.65 and 0.01, with especial preference between 0.6 and 0.01, with very special preference between 0.6 and 0.1 $SiOH/nm^2$.

In a particular preferred embodiment of the present invention the surface of the precipitated silica is doped with a multivalent cation. A base can be added to adapt pH value of the precipitated silica, which is preferably selected from the group consisting of $NH_3$, NaOH and $Ca(OH)_2$. In a special embodiment, the precipitated silica of the invention can be treated with an agent comprising at least one bivalent cation and at least one base.

Said multivalent, preferably bivalent and/or trivalent cation is selected from the alkaline earth metal group or the transition metal group, preferably from the group consisting of $Mg^{2+}$, $Ca^{2+}$, $Zn^{2+}$ and $Al^{3+}$. Doping the silica surface with multivalent cations has the technical advantage of increasing the thickening effect of the silica in the unsaturated polyester resin.

The silica of the present invention can be prepared by milling and classifying a precipitated silica having
- a Sears number of from 10 to 30 ml/(5 g), preferably 10 to 25 ml/(5 g),
- a BET-surface of from 100 to 350 $m^2/g$, preferably 130 to 300 $m^2/g$,
- a loss on drying of from 2 to 8% by weight, preferably 2 to 7% by weight, more preferably 2.5 to 6% by weight,
- a loss on ignition of from 2 to 9% by weight, preferably 2 to 7% by weight, more preferably 2.5 to 5% by weight,
- a pH-value of from 4 to 9, preferably 4 to 8, more preferably 5 to 8, and
- a DBP-value of from 230 g/100 g to 400, preferably of from 250 to 350 g/100 g.

with a grinding system (grinding apparatus), particular preferred a grinding system comprising a jet mill, characterized in that the mill of the grinding system is operated in the grinding phase with an operational medium selected from the group consisting of gas and/or vapor, preferably steam, and/or a gas comprising steam, and in that the grinding chamber is heated in a heating phase, i.e. before the actual operation with the operational medium, such that the temperature in the grinding chamber and/or at the mill outlet is higher than the dew point of the vapor and/or operational medium and in that the milled silica is classified to a $d_{50}$-value of from 150-2000 nm and a $d_{90}$-value of from 500-7000 nm.

Commercially available silica suitable as starting materials are Sipernat 160, Sipernat 22, Sipernat 22 S, Sipernat 22 LS of Evonik Degussa GmbH, Germany, and a silica grade called YH 350, of DWS, China.

The choice of an appropriate starting silica influences the milling and thus the thixotropy and viscosity properties of the silica obtained.

Grinding takes place with particular preference in accordance with the method described in DE 10 2006 048 850.4, using the grinding system (mill) described therein the operational medium used being, with especial preference, steam. German patent applications DE 102006024591.1 filed May 26, 2006, DE 102007004757.8, filed Jan. 31, 2007 and DE 102006048850.4, filed Oct. 16, 2006, are incorporated herein by reference.

In FIG. 1 the reference numerals are as follows: jet mill (1), cylindrical housing (2), grinding chamber (3), feed of material to be grinded (milled) (4), grinding jet inlet (5), heating opening or nozzle (5a), product outlet (6), air classifier (7), classifying wheel (8), inlet opening or inlet nozzle (9), grinding jet (10), heat source (11), heat source (12), supply pipe (13), thermal insulation jacket (14), inlet (15), outlet (16), centre of grinding chamber (17), reservoir or generating means (18), a tank (18a) and pipe installations (19).

Figure 2:
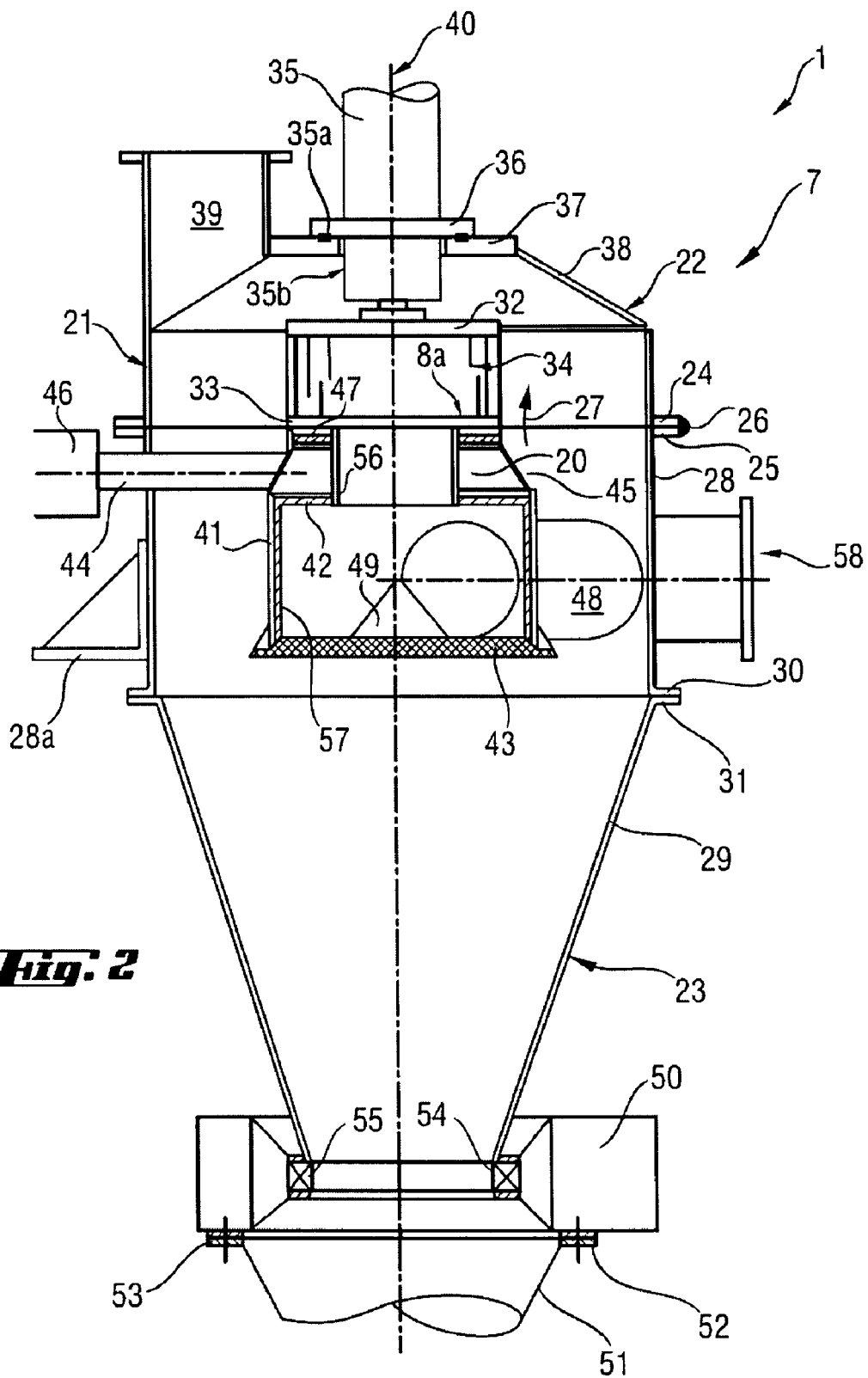
FIG. 2 shows a fluid-bed opposed-jet mill with an integrated dynamic pneumatic classifier.

In FIG. 2, the reference numerals are as follows: jet mill (1), air classifier (7), classifier gap (8a), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a), discharge cone (29), Flange (30), Flange (31), cover plate (32), cover plate (33), paddle (34), classifying wheel shaft (35), pivot bearing (35a), shaft lead-through (35b), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (bevelled) at the inside edge, and lining (55), replaceable protection pipe (56), replaceable protection pipe (57), fines exit/outlet (58).

Figure 3:
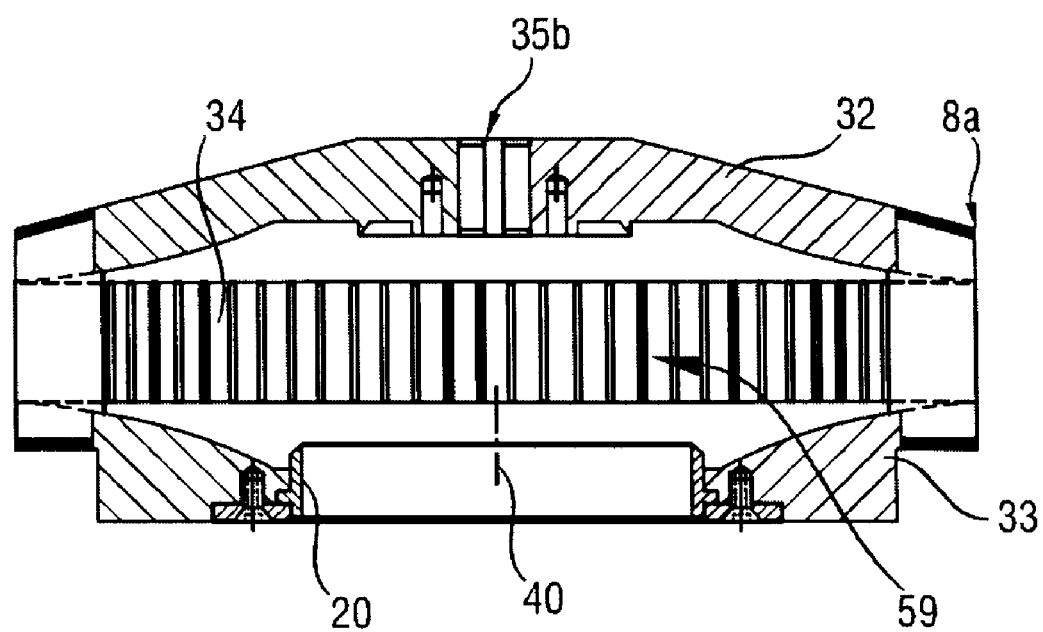
FIG. 3 shows an integrated dynamic pneumatic classifier.

In FIG. 3, the reference numerals are as follows: classifier gap (8a), exit port (immersed pipe) (20), cover plate (32), cover plate (33), paddle (34), shaft lead-through (35b), axis of rotation (40), ring of paddles (59).

Figure 4:
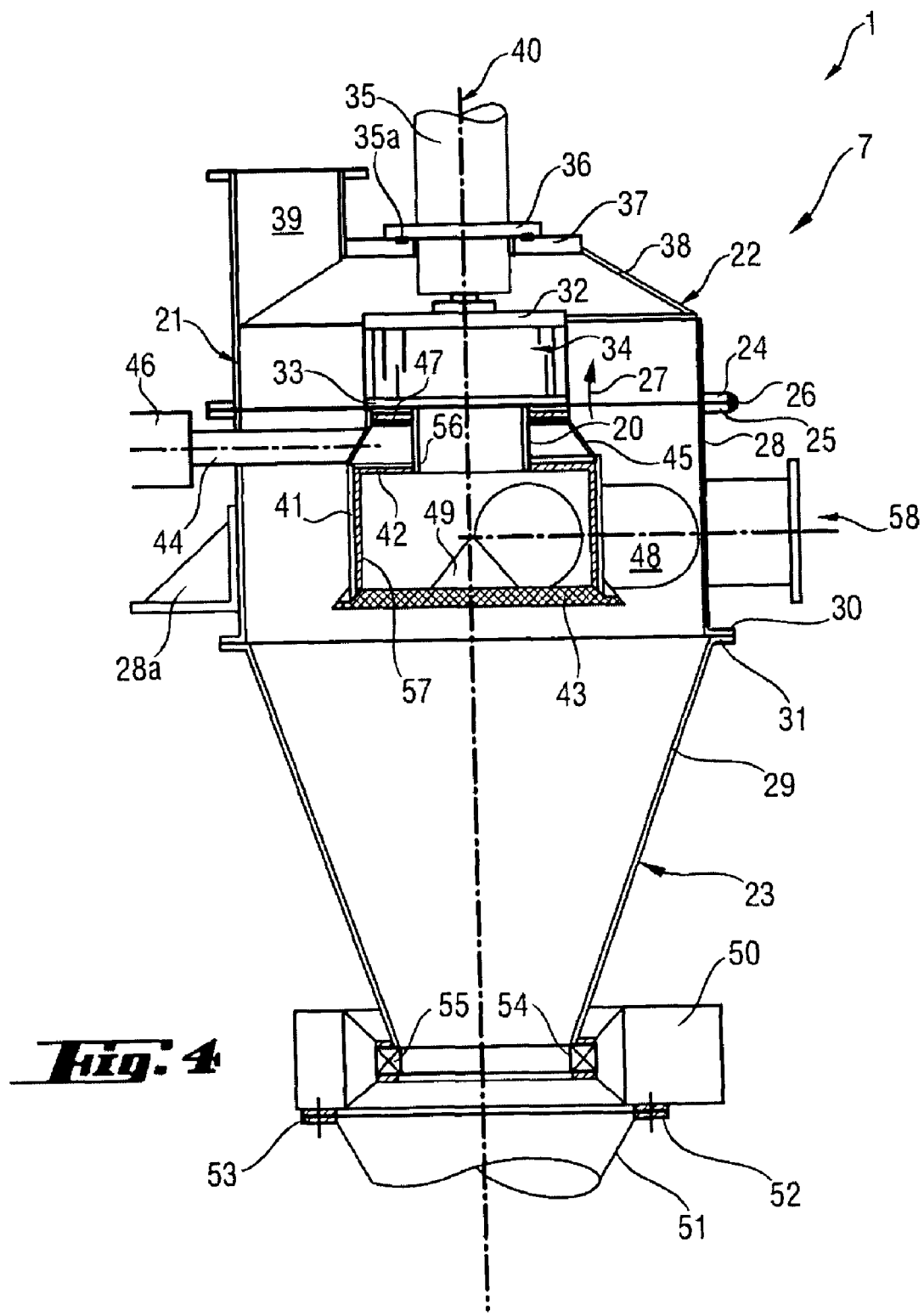
FIG. 4 shows a fluid-bed opposed-jet mill with an integrated dynamic pneumatic classifier.

In FIG. 4, the reference numerals are as follows: jet mill (1), air classifier (7), exit port (immersed pipe) (20), classifier housing (21), top housing part (22), Bottom housing part (23), circumferential flange (24), circumferential flange (25), articulated joint (26), arrow (27), classifier chamber housing (28), carrying arms (28a), discharge cone (29), Flange (30), Flange (31), cover plate (32), cover plate (33), paddle (34), classifying wheel shaft (35), pivot bearing (35a), top machined plates (36), Bottom machined plate (37), end section of housing (38), product feed port (39), axis of rotation (40), outlet chamber (41), top cover plate (42), removable lid (43), carrying arms (44), conical annular housing (45), intake filter (46), perforated plate (47), fines discharge pipe (48), deflection cone (49), classifying air entry coil (50), coarse material discharge (51), flange (52), flange (53), dispersion zone (54), flange machined (beveled) at the inside edge, and lining (55), replaceable protection pipe (56), replaceable protection pipe (57), fines exit/outlet (58).

Figure 5:
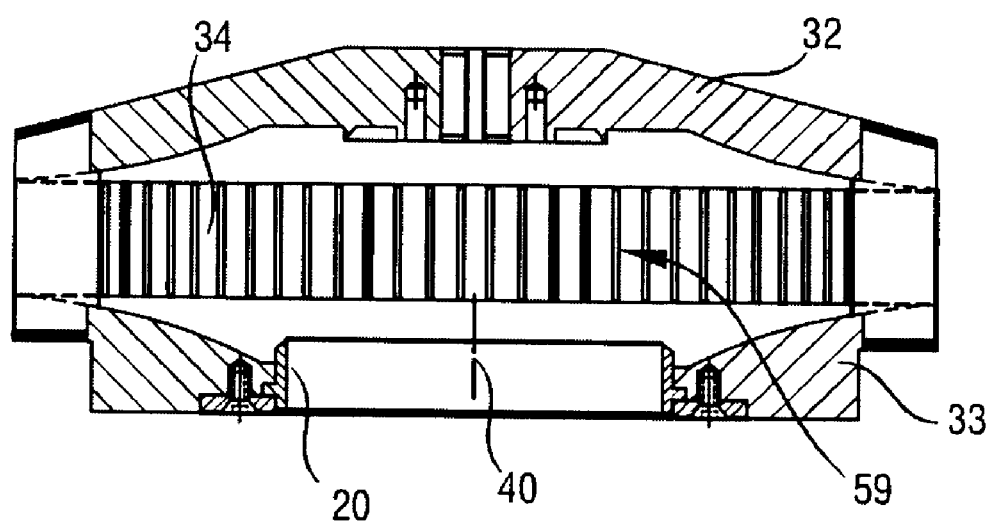
FIG. 5 shows an integrated dynamic pneumatic classifier.

In FIG. 5, the reference numerals are as follows: exit port (immersed pipe) (20), cover plate (32), cover plate (33), paddle (34), axis of rotation (40), ring of paddles (59).

In one especially preferred embodiment, in preparation for actual grinding with superheated steam, a fluid-bed opposed-jet mill as shown in FIG. 1, with an integrated dynamic pneumatic classifier as shown in FIGS. 2 and 3, is first heated via the two heating openings or nozzles (5a) (of which only one is depicted in FIG. 1) which are charged with hot compressed air, preferably at 10 bar and 160° C., until the mill exit temperature is higher than the dew point of the steam and/or operational medium, preferably about 105° C.

Connected downstream of the mill, for the separation of the ground material, is a filter system (not shown in FIG. 1) whose filter housing is heated in its lower third indirectly, via attached heating coils, by means of saturated steam (preferably 6 bar saturated steam), likewise for the purpose of preventing condensation. All of the apparatus surfaces in the region of the mill, the separation filter, and the supply lines for steam and hot compressed air have special insulation.

After the desired heating temperature has been reached, the supply of hot compressed air to the heating nozzles is shut off and the charging of the three grinding nozzles with superheated steam, preferably at 38 bar (abs) and 325° C., is commenced.

In order to protect the filter medium used in the separation filter and also in order to set a defined level of residual water in the ground material, of preferably 2% to 6%, water is introduced in the starting phase, and during grinding, into the grinding chamber of the mill, via a two-fluid nozzle operated with compressed air, as a function of the mill exit temperature.

The feed quantity is regulated as a function of the current flow of the classifier engine. The current flow regulates the feed quantity such that it is not possible to exceed approximately 70% of the nominal current flow.

The introduction member (4) which functions here is a speed-regulated bucket wheel which meters the feed material from a reservoir container via a cyclical lock, which serves as a barometric endpoint, into the grinding chamber, which is at superatmospheric pressure.

The coarse material is comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness is sufficient enter along with the grinding steam into the fines exit, and from there they pass into the downstream separating system, while particles which are too coarse pass back into the grinding zone and are subjected to a repeat comminuting. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

In a preferred embodiment, grinding is carried out as follows.

The process according to the invention is carried out in a milling system (milling apparatus), preferably in a milling system comprising a jet mill, particularly preferably comprising an opposed jet mill. For this purpose, a feed material to be comminuted is accelerated in expanding gas jets of high velocity and comminuted by particle-particle impacts. Very particularly preferably used jet mills are fluidized-bed opposed jet mills or dense-bed jet mills or spiral jet mills. In the case of the very particularly preferred fluidized-bed opposed jet mill, two or more milling jet inlets are present in the lower third of the milling chamber, preferably in the form of milling nozzles, which are preferably present in a horizontal plane. The milling jet inlets are particularly preferably arranged at the circumference of the preferably round milling container so that the milling jets all meet at one point in the interior of the milling container. Particularly preferably, the milling jet inlets are distributed uniformly over the circumference of the milling container. In the case of three milling jet inlets, the space would therefore be 120° in each case.

In a special embodiment of the process according to the invention, the milling system (milling apparatus) comprises a classifier, preferably a dynamic classifier, particularly preferably a dynamic paddle wheel classifier, especially preferably a classifier according to FIGS. 4 and 5.

In a particularly preferred embodiment, a dynamic air classifier according to FIGS. 2 and 3 is used. This dynamic air classifier contains a classifying wheel and a classifying wheel shaft and a classifier housing, a classifier gap being formed between the classifying wheel and the classifier housing and a shaft lead-through being formed between the classifying wheel shaft and the classifier housing, and is characterized in that flushing of classifier gap and/or shaft lead-through with compressed gases of low energy is effected.

When using a classifier in combination with the jet mill operated under the conditions according to the invention, a limit is imposed on the oversize particles, the product particles ascending together with the expanded gas jets being passed from the centre of the milling container through the classifier, and the product which has a sufficient fineness then being discharged from the classifier and from the mill. Particles which are too coarse return to the milling zone and are subjected to further comminution.

In the milling system, a classifier can be connected as a separate unit downstream of the mill, but an integrated classifier is preferably used.

This particular preferred grinding process according to the present invention comprises a heat-up phase which is included upstream of the actual milling step, in which heat-up phase it is ensured that the milling chamber, particularly preferably all substantial components of the mill and/or of the milling system on which water and/or steam could condense, is/are heated up so that its/their temperature is above the dew point of the vapour. The heating up can in principle be effected by any heating method. However, the heating up is preferably effected by passing hot gas through the mill and/or the entire milling system so that the temperature of the gas is higher at the mill exit than the dew point of the vapour. Particularly preferably, it is ensured that the hot gas preferably sufficiently heats up all substantial components of the mill and/or of the entire milling system which come into contact with the steam.

The heating gas used can in principle be any desired gas and/or gas mixtures, but hot air and/or combustion gases and/or inert gases are preferably used. The temperature of the hot gas is above the dew point of the steam.

The hot gas can in principle be introduced at any desired point into the milling chamber. Inlets or nozzles are preferably present for this purpose in the milling chamber. These inlets or nozzles may be the same inlets or nozzles through which the milling jets are also passed during the milling phase (milling nozzles). However, it is also possible for separate inlets or nozzles (heating nozzles) through which the hot gas and/or gas mixture can be passed to be present in the milling chamber. In a preferred embodiment, the heating gas or heating gas mixture is introduced through at least two, preferably three or more, inlets and nozzles which are arranged in a plane and are arranged at the circumference of the preferably round mill container in such a way that the jets all meet at one point in the interior of the milling container. Particularly preferably, the inlets or nozzles are distributed uniformly over the circumference of the milling container.

During the milling, a gas and/or a vapour, preferably steam and/or a gas/steam mixture, is let down through the milling jet inlets, preferably in the form of milling nozzles, as operating medium. This operating medium has as a rule a substantially higher sound velocity than air (343 m/s), preferably at least 450 m/s. Advantageously, the operating medium comprises steam and/or hydrogen gas and/or argon and/or helium. It is particularly preferably superheated steam. In order to achieve very fine milling, it has proved particularly advantageous if the operating medium is let down into the mill at a pressure of 15 to 250 bar, particularly preferably of 20 to 150 bar, very particularly preferably 30 to 70 bar and especially preferably 40 to 65 bar. The operating medium also particularly preferably has a temperature of 200 to 800° C., particularly preferably 250 to 600° C. and in particular 300 to 400° C. The pressure includes all values and subvalues therebetween, especially including 20, 40, 60, 80, 100, 120, 140, 160, 180, 200, 220 and 240 bar. The temperature of the operating medium includes all values and subvalues therebetween, especially including 250, 300, 350, 400, 450, 500, 550, 600, 650, 700, 750° C.

In the case of steam as an operating medium, i.e. particularly when the vapour feed pipe is connected to a steam source, it proves to be particularly advantageous if the milling or inlet nozzles are connected to a vapour feed pipe which is equipped with expansion bends.

Furthermore, it has proved to be advantageous if the surface of the jet mill has as small a value as possible and/or the flow paths are at least substantially free of projections and/or if the components of the jet mill are designed for avoiding accumulations. By these measures, deposition of the material to be milled in the mill can additionally be prevented.

The invention is explained in more detail merely by way of example with reference to the below-described preferred and special embodiments of the process according to the invention and the preferred and particularly suitable versions of jet mills and the drawings and descriptions of the drawings, i.e. it is not limited to these working examples and use examples or to the respective combinations of features within individual working examples.

Individual features which are stated and/or shown in relation to specific working examples are not limited to these working examples or the combination with the other features of these working examples but can be combined, within the technical possibilities, with any other variants, even if they are not separately discussed in the present documents.

Identical reference numerals in the individual figures and images of the drawings designate identical or similar components or components having an identical or similar effect. The diagrams in the drawing also clarify those features which are not provided with reference numerals, regardless of whether such features are described below or not. On the other hand, features which are contained in the present description but not visible or shown in the drawing, are also readily understandable for a person skilled in the art.

As already indicated above, a jet mill, preferably an opposed jet mill, comprising integrated classifier, preferably an integrated dynamic air classifier, can be used for the production of very fine particles in the process according to the invention. Particularly preferably, the air classifier contains a classifying wheel and a classifying wheel shaft and a classifier housing, a classifier gap being formed between the classifying wheel and the classifier housing and a shaft lead-through being formed between the classifying wheel shaft and the classifier housing, and is operated in such a way that flushing of classifier gap and/or shaft lead-through with compressed gases of low energy is effected.

Preferably, the flushing gas is used at a pressure of not more than at least approximately 0.4 bar, particularly preferably not more than at least about 0.3 bar and in particular not more than about 0.2 bar above the internal pressure of the mill. The internal pressure of the mill may be at least about in the range from 0.1 to 0.5 bar.

Furthermore, it is preferable if the flushing gas is used at a temperature of about 80 to about 120° C., in particular approximately 100° C., and/or if the flushing gas used is low-energy compressed air, in particular at about 0.3 bar to about 0.4 bar.

The speed of a classifying rotor of the air classifier and the internal amplification ratio can be chosen or set or can be regulatable so that the circumferential speed of the operating medium (B) at a dip tube or outlet nozzle coordinated with the classifying wheel reaches up to 0.8 times the sound velocity of the operating medium.

This can be further developed if the speed of a classifying rotor of the air classifier and the internal amplification ratio are chosen or set or are regulatable so that the circumferential speed of the operating medium (B) at the dip tube or outlet nozzle reaches up to 0.7 times and particularly preferably up to 0.6 times the sound velocity of the operating medium.

In particular, it is furthermore possible advantageously to ensure that the classifying rotor has a height clearance which increases with decreasing radius, that area of the classifying rotor through which flow takes place preferably being at least approximately constant. Alternatively or in addition, it may be advantageous if the classifying rotor has an interchangeable, corotating dip tube. In an even further variant, it is preferable to provide a fines outlet chamber which has a widening cross section in the direction of flow.

Furthermore, the jet mill according to the invention can advantageously contain in particular an air classifier which contains the individual features or combinations of features of the wind classifier according to EP 0 472 930 B1. The entire disclosure content of EP 0 472 930 B1 is hereby fully incorporated by reference in order to avoid simply adopting identical subject matter. In particular, the air classifier may contain means for reducing the circumferential components of flow according to EP 0 472 930 B1. It is possible in particular to ensure that an outlet nozzle which is coordinated with the classifying wheel of the air classifier and is in the form of a dip tube has, in the direction of flow, a widening cross section which is preferably designed to be rounded for avoiding eddy formations.

Preferred and/or advantageous embodiments of the milling system which can be used in the process according to the invention or of the mill are evident from FIGS. 1 to 5 and the associated description, it once again being emphasized that these embodiments merely explain the invention in more detail by way of example, i.e. said invention is not limited to these working examples and use examples or to the respective combinations of features within individual working examples.

Individual features which are stated and/or shown in relation to specific working examples are not limited to these working examples or the combination with the other features of these working examples but can be combined within the technical possibilities with any other variants, even if they are not separately discussed in the present documents.

Identical reference numerals in the individual figures and images of the drawings designate identical or similar components and components having an identical or similar effect. The diagrams in the drawing also clarify those features which are not provided with reference numerals, regardless of whether such features are described below or not. On the other hand, features which are contained in the present description but aren't visible or shown in the drawing are also readily understandable for a person skilled in the art.

FIG. 1 shows a working example of a jet mill 1 comprising a cylindrical housing 2, which encloses a milling chamber 3, a feed 4 of material to be grinded (milled), approximately at half the height of the milling chamber 3, at least one milling jet inlet 5 in the lower region of the milling chamber 3 and a product outlet 6 in the upper region of the milling chamber 3. Arranged there is an air classifier 7 having a rotatable classifying wheel 8 with which the milled material (not shown) is classified in order to remove only milled material below a certain particle size through the product outlet 6 from the milling chamber 3 and to feed milled material having a particle size above the chosen value to a further milling process.

The classifying wheel 8 may be a classifying wheel which is customary in air classifiers and the blades of which (cf. below, for example in relation to FIG. 5) bound radial blade channels, at the outer ends of which the classifying air enters and particles of relatively small particle size or mass are entrained to the central outlet and to the product outlet 6 while larger particles or particles of greater mass are rejected under the influence of centrifugal force. Particularly preferably, the air classifier 7 and/or at least the classifying wheel 8 thereof are equipped with at least one design feature according to EP 0 472 930 B1.

It is possible to provide only one milling jet inlet 5, for example consisting of a single, radially directed inlet opening or inlet nozzle 9, in order to enable a single milling jet 10 to meet, at high energy, the particles of material to be milled which reach the region of the milling jet 10 from the feed 4 of material to be grinded (milled), and to divide the particles of material to be milled into smaller particles which are taken in by the classifying wheel 8 and, if they have reached an appropriately small size or mass, are transported to the outside through the product outlet 6. However, a better effect is achieved with milling jet inlets 5 which are diametrically opposite one another in pairs and form two milling jets 10 which strike one another and result in more intense particle division than is possible with only one milling jet 10, in particular if a plurality of milling jet pairs are produced.

Preferably two or more milling jet inlets, preferably milling nozzles, in particular 3, 4, 5, 6, 7, 8, 9, 10, 11 or 12 milling jet inlets, which are arranged in the lower third of the preferably cylindrical housing of the milling chamber, are used. These milling jet inlets are ideally arranged distributed in a plane and uniformly over the circumference of the milling container so that the milling jets all meet at one point in the interior of the milling container. Particularly preferably, the inlets or nozzles are distributed uniformly over the circumference of the milling container. In the case of three milling jets, this would be an angle of 120° between the respective inlets or nozzles. In general, it may be said that the larger the milling chamber, the more inlets or milling nozzles are used.

In a preferred embodiment of the process according to the invention, the milling chamber can, in addition to the milling jet inlets, contain heating openings or nozzles 5a, preferably in the form of heating nozzles, through which hot gas can be passed into the mill in the heat-up phase. These nozzles or openings can—as already described above—be arranged in the same plane as the milling openings or nozzles 5. One heating opening or nozzle 5a, but preferably also a plurality of heating openings or nozzles 5a, particularly preferably 2, 3, 4, 5, 6, 7 or 8 heating openings or nozzles 5a, may be present.

In a very particularly preferred embodiment, the mill contains two heating nozzles or openings and three milling nozzles or openings.

For example, the processing temperature can furthermore be influenced by using an internal heating source 11 between feed 4 of material to be (grinded) milled and the region of the milling jets 10 or a corresponding heating source 12 in the region outside the feed 4 of material to be grinded (milled), or by processing particles of material to be milled which is in any case already warm and avoids heat losses in reaching the feed 4 of material to be grinded (milled), for which purpose a feed tube 13 is surrounded by a temperature-insulating jacket 14. The heating source 11 or 12, if it is used, can in principle be of any desired form and therefore usable for the particular purpose and chosen according to availability on the market so that further explanations in this context are not required.

In particular, the temperature of the milling jet or of the milling jets 10 is relevant to the temperature, and the temperature of the material to be milled should at least approximately correspond to this milling jet temperature.

For the formation of the milling jets 10 introduced through milling jet inlets 5 into the milling chamber 3, superheated steam is used in the present working example. It is to be assumed that the heat content of the steam after the inlet nozzle 9 of the respective milling jet inlet 5 is not substantially lower than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be very substantially converted into flow energy) and the temperature drop too will not be inconsiderable. This temperature drop in particular should be compensated by the heating of the material to be milled, to such an extent that material to be milled and milling jet 10 have the same temperature in the region of the centre 17 of the milling chamber 3 when at least two milling jets 10 meet one another or in the case of a multiplicity of two milling jets 10.

Regarding the design of and procedure for preparing the milling jet 10 comprising superheated steam, in particular in the form of a closed system, reference is made to DE 198 24 062 A1, the complete disclosure content of which in this regard is hereby incorporated by reference in order to avoid simply adopting identical subject matter. For example, milling of hot slag as material to be milled is possible with optimum efficiency by a closed system.

In FIG. 1 of the jet mill 1, any feed of an operating medium B is typified by a reservoir or generation device 18, which represents, for example, a tank 18a, from which the operating medium B is passed via pipe devices 19 to the milling jet inlet 5 or the milling jet inlets 5 to form the milling jet 10 or the milling jets 10.

In particular, starting from a jet mill 1 equipped with an air classifier 7, the relevant working examples being intended and understood herein only as exemplary and not as limiting, a process for producing very fine particles is carried out with this jet mill 1 using an integrated dynamic air classifier 7. Apart from the fact that the milling phase is preceded by a heat-up phase in which all parts which come into contact with the vapour are heated to a temperature above the dew point of the vapour and the fact that a preferably integrated classifier is used, the innovation compared with conventional jet mills is that the speed of the classifying rotor or classifying wheel 8 of the air classifier 7 and the internal amplification ratio are preferably chosen, set or regulated so that the circumferential speed of an operating medium B at a dip tube or outlet nozzle 20 coordinated with the classifying wheel 8 reaches up to 0.8 times, preferably up to 0.7 times and particularly preferably up to 0.6 times the sound velocity of the operating medium B.

With reference to the previously explained variant with superheated steam as operating medium B or as an alternative thereto, it is particularly advantageous to use, as operating medium, gases or vapours B which have a higher and in particular substantially higher sound velocity than air (343 m/s). Specifically, gases or vapours B which have a sound velocity of at least 450 m/s are used as operating medium. This substantially improves the production and the yield of very fine particles compared with processes using other operating media, as are conventionally used according to practical knowledge, and hence optimizes the process overall.

A fluid, preferably the abovementioned steam, but also hydrogen gas or helium gas, is used as operating medium B.

In a preferred embodiment, the jet mill 1, which is in particular a fluidized-bed jet mill or a dense-bed jet mill or a spiral jet mill, is formed or designed with the integrated dynamic air classifier 7 for producing very fine particles or provided with suitable devices so that the speed of the classifying rotor or classifying wheel 8 of the air classifier 7 and the internal amplification ratio are chosen or set or regulatable or controllable so that the circumferential speed of the operating medium B at the dip tube or outlet nozzle 20 reaches up to 0.8 times, preferably up to 0.7 times and particularly preferably up to 0.6 times the sound velocity of the operating medium B.

Furthermore, the jet mill 1 is preferably equipped with a source, for example the reservoir or generation device 18 for steam or superheated steam or another suitable reservoir or generation device, for an operating medium B, or such an operating medium source is coordinated with it, from which, for operation, an operating medium B is fed at a higher and in particular substantially higher sound velocity than air (343 m/s), such as, preferably, a sound velocity of at least 450 m/s. This operating medium source, such as, for example, the reservoir or generation device 18 for steam or superheated steam, contains gases or vapours B for use during operation of the jet mill 1, in particular the abovementioned steam but hydrogen gas and helium gas are also preferred alternatives.

Particularly with the use of hot steam as operating medium B, it is advantageous to provide pipe devices 19 which are equipped with expansion bends (not shown), and are then also to be designated as vapour feed pipe, to the inlet or milling nozzles 9, i.e. preferably when the vapour feed pipe is connected to a steam source as a reservoir or generation device 18.

A further advantageous aspect in the use of steam as operating medium B consists in providing the jet mill 1 with a surface which is as small as possible, or in other words in optimizing the jet mill 1 with regard to as small a surface as possible. Particularly in relation to steam as operating medium B, it is particularly advantageous to avoid heat exchange or heat loss and hence energy loss in the system. This purpose is also served by the further alternative or additional design measures, namely designing the components of the jet mill 1 for avoiding accumulations or optimizing said components in this respect. This can be realized, for example, by using flanges which are as thin as possible in the pipe devices 19 and for connection of the pipe devices 19.

Energy loss and also other flow-relevant adverse effects can furthermore be suppressed or avoided if the components of the jet mill 1 are designed or optimized for avoiding condensation. Even special devices (not shown) for avoiding condensation may be present for this purpose. Furthermore, it is advantageous if the flow paths are at least substantially free of projections or optimized in this respect. In other words, the principle of avoiding as much as possible or everything which can become cold and where condensation may therefore arise is implemented by these design variants individually or in any desired combinations.

Furthermore, it is advantageous and therefore preferable if the classifying rotor has a height clearance increasing with decreasing radius, i.e. towards its axis, in particular that area of the classifying rotor through which flow takes place being at least approximately constant. Firstly or alternatively, it is possible to provide a fines outlet chamber which has a widening cross section in the direction of flow.

A particularly preferred embodiment in the case of the jet mill 1 consists in the classifying rotor 8 having an interchangeable, corotating dip tube 20.

Further details and variants of preferred designs of the jet mill 1 and its components are explained below with reference to FIGS. 4 and 5.

The jet mill 1 preferably contains, as shown in the schematic diagram in FIG. 4, an integrated air classifier 7 which is, for example in the case of designs of the jet mill 1 as a fluidized-bed jet mill or as a dense-bed jet mill or as a spiral jet mill, a dynamic air classifier 7 which is advantageously arranged in the centre of the milling chamber 3 of the jet mill 1. Depending on the volume flow rate of milling gas and classifier speed, the desired fineness of the material to be milled can be influenced.

In the air classifier 7 of the jet mill 1 according to FIG. 4, the entire vertical air classifier 7 is enclosed by a classifier housing 21 which substantially comprises the upper part 22 of the housing and the lower part 23 of the housing. The upper part 22 of the housing and the lower part 23 of the housing are provided at the upper and lower edge, respectively, with in each case an outward-directed circumferential flange 24 and 25, respectively. The two circumferential flanges 24, 25 are present one on top of the other in the installation or operational state of the air classifier 8 and are fixed by suitable means to one another. Suitable means for fixing are, for example, screw connections (not shown). Clamps (not shown) or the like can also serve as detachable fixing means.

At virtually any desired point of the flange circumference, two circumferential flanges 24 and 25 are connected to one another by a joint 26 so that, after the flange connecting means have been released, the upper part 22 of the housing can be swiveled upwards relative to the lower part 23 of the housing in the direction of the arrow 27 and the upper part 22 of the housing is accessible from below and the lower part 23 of the housing from above. The lower part 23 of the housing in turn is formed in two parts and substantially comprises the cylindrical classifier chamber housing 28 with the circumferential flange 25 at its upper open end and a discharge cone 29 which tapers conically downwards. The discharge cone 29 and the classifier chamber housing 28 rest one on top of the other with flanges 30, 31 at the upper and lower end, respectively, and the two flanges 30, 31 of discharge cone 29 and classifier chamber housing 28 are connected to one another by detachable fixing means (not shown) like the circumferential flanges 24, 25. The classifier housing 21 assembled in this manner is suspended in or from support arms 28a, a plurality of which are distributed as far as possible uniformly spaced around the circumference of the classifier or compressor housing 21 of the air classifier 7 of the jet mill 1 and grip the cylindrical classifier chamber housing 28.

A substantial part of the housing internals of the air classifier 7 is in turn the classifying wheel 8 having an upper cover disc 32, having a lower cover disc 33 axially a distance away and on the outflow side and having blades 34 of expedient contour which are arranged between the outer edges of the two cover discs 32 and 33, firmly connected to these and distributed uniformly around the circumference of the classifying wheel 8. In the case of this air classifier 7, the classifying wheel 8 is driven via the upper cover disc 32 while the lower cover disc 33 is the cover disc on the outflow side. The mounting of the classifying wheel 8 comprises a classifying wheel shaft 35 which is positively driven in an expedient manner, is led out of the classifier housing 21 at the upper end and, with its lower end inside the classifier housing 21, supports the classifying wheel 8 non-rotatably in an overhung bearing. The classifying wheel shaft 35 is led out of the classifier housing 21 in a pair of worked plates 36, 37 which close the classifier housing 21 at the upper end of a housing end section 38 in the form of a truncated cone at the top, guide the classifying wheel shaft 35 and seal this shaft passage without hindering the rotational movements of the classifying wheel shaft 35. Expediently, the upper plate 36 can be coordinated in the form of a flange non-rotatably with the classifying wheel shaft 35 and supported nonrotatably via rotary bearing 35a on the lower plate 37, which in turn is coordinated with a housing end section 38. The underside of the cover disc 33 on the outflow side is in the common plane between the circumferential flanges 24 and 25 so that the classifying wheel 8 is arranged in its totality within the hinged upper part 22 of the housing. In the region of the conical housing end section 38, the upper part 22 of the housing also has a tubular product feed nozzle 39 of the feed 4 of material to be grinded (milled), the longitudinal axis of which product feed nozzle is parallel to the axis 40 of rotation of the classifying wheel 8 and its drive or classifying wheel shaft 35 and which product feed nozzle is arranged radially outside on the upper part 22 of the housing, as far as possible from this axis 40 of rotation of the classifying wheel 8 and its drive or classifying wheel shaft 35.

In a particularly preferred embodiment according to FIGS. 2 and 3, the integrated dynamic air classifier 1 contains a classifying wheel 8 and a classifying wheel shaft 35 and a classifier housing, as was already explained. A classifier gap 8a is defined between the classifying wheel 8 and the classifier housing 21, and a shaft lead-through 35b is formed between the classifying wheel shaft and the classifier housing 21 (cf. in this context FIGS. 2 and 3). In particular, starting from a jet mill 1 equipped with such an air classifier 7, the relevant working examples being understood here as being only exemplary and not limiting, a process for producing very fine particles is carried out using this jet mill 1, comprising an integrated dynamic air classifier 7. In addition to the fact that the milling chamber is heated before the milling phase to a temperature above the dew point of the vapour, the innovation compared with conventional jet mills consists in flushing of classifier gap 8a and/or shaft lead-through 35b with compressed gases of low energy. The peculiarity of this design is precisely the combination of the use of these compressed low-energy gases with the high-energy superheated steam, with which the mill is fed through the milling jet inlets, in particular milling nozzles or milling nozzles present therein. Thus, high-energy media and low-energy media are simultaneously used.

In the embodiment according to both FIGS. 4 and 5 on the one hand and 2 and 3 on the other hand, the classifier housing 21 receives the tubular outlet nozzle 20 which is arranged axially identically with the classifying wheel 8 and rests with its upper end just below the cover disc 33 of the classifying wheel 8, which cover disc is on the outflow side, but without being connected thereto. Mounted axially in coincidence at the lower end of the outlet nozzle 20 in the form of a tube is an outlet chamber 41 which is likewise tubular but the diameter of which is substantially larger than the diameter of the outlet nozzle 20 and in the present working example is at least twice as large as the diameter of the outlet nozzle 20. A substantial jump in diameter is therefore present at the transition between the outlet nozzle 20 and the outlet chamber 41. The outlet nozzle 20 is inserted into an upper cover plate 42 of the outlet chamber 41. At the bottom, the outlet chamber 41 is closed by a removable cover 43. The assembly comprising outlet nozzle 20 and outlet chamber 41 is held in a plurality of support arms 44 which are distributed uniformly in a star-like manner around the circumference of the assembly, connected firmly at their inner ends in the region of the outlet nozzle 20 to the assembly and fixed with their outer ends to the classifier housing 21.

The outlet nozzle 20 is surrounded by a conical annular housing 45, the lower, larger external diameter of which corresponds at least approximately to the diameter of the outlet chamber 41 and the upper, smaller external diameter of which corresponds at least approximately to the diameter of the classifying wheel 8. The support arms 44 end at the conical wall of the annular housing 45 and are connected firmly to this wall, which in turn is part of the assembly comprising outlet nozzle 20 and outlet chamber 41.

The support arms 44 and the annular housing 45 are parts of the flushing air device (not shown), the flushing air preventing the penetration of material from the interior of the classifier housing 21 into the gap between the classifying wheel 8 or more exactly the lower cover disc 3 thereof and the outlet nozzle 20. In order to enable this flushing air to reach the annular housing 45 and from there the gap to be kept free, the support arms 44 are in the form of tubes, with their outer end sections led through the wall of the classifier housing 21 and connected via an intake filter 46 to a flushing air source (not shown). The annular housing 45 is closed at the top by a perforated plate 47 and the gap itself can be adjustable by an axially adjustable annular disc in the region between perforated plate 47 and lower cover disc 33 of the classifying wheel 8.

The outlet from the outlet chamber 41 is formed by a fines discharge tube 48 which is led from the outside into the classifier housing 21 and is connected tangentially to the outlet chamber 41. The fines discharge tube 48 is part of the product outlet 6. A deflection cone 49 serves for cladding the entrance of the fines discharge tube 48 at the outlet chamber 41.

At the lower end of the conical housing end section 38, a classifying air entry spiral 50 and a coarse material discharge 51 are coordinated in horizontal arrangement with the housing end section 38. The direction of rotation of the classifying air entry spiral 50 is in the opposite direction to the direction of rotation of the classifying wheel 8. The coarse material discharge 51 is detachably coordinated with the housing end section 38, a flange 52 being coordinated with the lower end of the housing end section 38 and a flange 53 with the upper end of the coarse material discharge 51, and both flanges 52 and 53 in turn being detachably connected to one another by known means when the air classifier 7 is ready for operation.

The dispersion zone to be designed is designated by 54. Flanges worked (bevelled) on the inner edge, for clean flow, and a simple lining are designated by 55.

Finally, an interchangeable protective tube 56 is also mounted as a closure part on the inner wall of the outlet nozzle 20, and a corresponding interchangeable protective tube 57 can be mounted on the inner wall of the outlet chamber 41.

At the beginning of operation of the air classifier 7 in the operating state shown, classifying air is introduced via the classifying air entry spiral 50 into the air classifier 7 under a pressure gradient and with an entry velocity chosen according to the purpose. As a result of introducing the classifying air by means of a spiral, in particular in combination with the conicity of the housing end section 38, the classifying air rises spirally upwards in the region of the classifying wheel 8. At the same time, the "product" comprising solid particles of different mass is introduced via the product feed nozzle 39 into the classifier housing 21. Of this product, the coarse material, i.e. the particle fraction having a greater mass, moves in a direction opposite to the classifying air into the region of the coarse material discharge 51 and is provided for further processing. The fines, i.e. the particle fraction having a lower mass, is mixed with the classifying air, passes radially from the outside inwards through the classifying wheel 8 into the outlet nozzle 20, into the outlet chamber 41 and finally via a fines outlet tube 48 into a fines outlet 58, and from there into a filter in which the operating medium in the form of a fluid, such as, for example air, and fines are separated from one another. Coarser constituents of the fines are removed radially from the classifying wheel 8 by centrifugal force and mixed with the coarse material in order to leave the classifier housing 21 with the coarse material or to circulate in the classifier housing 21 until it has become fines having a particle size such that it is discharged with the classifying air.

Owing to the abrupt widening of the cross section from the outlet nozzle 20 to the outlet chamber 41, a substantial reduction in the flow velocity of the fines/air mixture takes place there. This mixture will therefore pass at a very low flow velocity through the outlet chamber 41 via the fines outlet tube 48 into the fines outlet 58 and produce only a small amount of abraded material on the wall of the outlet chamber 41. For this reason, the protective tube 57 is also only a very precautionary measure. The high flow velocity in the classifying wheel 8 for reasons relating to a good separation technique, also prevails, however, in the discharge or outlet nozzle 20, and the protective tube 56 is therefore more important than the protective tube 57. Particularly preferred is the jump in diameter with a diameter increase at the transition from the outlet nozzle 20 into the outlet chamber 41.

The air classifier 7 can besides in turn be readily maintained as a result of the subdivision of the classifier housing 21 in the manner described and the coordination of the classifier components with the individual part-housings, and components which have become damaged can be changed with relatively little effort and within short maintenance times.

While the classifying wheel 8 with the two cover discs 32 and 33 and the blade ring 59 arranged between them and having the blades 34 is shown in the schematic diagram of FIGS. 4 and 2 in the already known, customary form with parallel cover discs 32 and 33 having parallel surfaces, the classifying wheel 8 is shown in FIGS. 5 and 3 for a further working example of the air classifier 7 of an advantageous further development.

This classifying wheel 8 according to FIGS. 5 and 3 contains, in addition to the blade ring 59 with the blades 34, the upper cover disc 32 and the lower cover disc 33 an axial distance away therefrom and located on the outflow side, and is rotatable about the axis 40 of rotation and thus the longitudinal axis of the air classifier 7. The diametral dimension of the classifying wheel 8 is perpendicular to the axis 40 of rotation, i.e. to the longitudinal axis of the air classifier 7, regardless of whether the axis 40 of rotation and hence said longitudinal axis are perpendicular or horizontal. The lower cover disc 33 on the outflow side concentrically encloses the outlet nozzle 20. The blades 34 are connected to the two cover discs 33 and 32. The two cover discs 32 and 33 are now, in contrast to the prior art, conical, preferably such that the distance of the upper cover disc 32 from the cover disc 33 on the outflow side increases from the ring 59 of blades 34 inwards, i.e. towards the axis 40 of rotation, and does so preferably continuously, such as, for example, linearly or non-linearly, and more preferably so that the area of the cylinder jacket through which flow takes place remains approximately constant for every radius between blade outlet edges and outlet nozzle 20. The outflow velocity which decreases owing to the decreasing radius in known solutions remains at least approximately constant in this solution.

In addition to that variant of the design of the upper cover disc 32 and of the lower cover disc 33 which is explained above and in FIGS. 5 and 3, it is also possible for only one of these two cover discs 32 or 33 to be conical in the manner explained and for the other cover disc 33 or 32 to be flat, as is the case for both cover discs 32 and 33 in relation to the working example according to FIG. 4. In particular, the shape of the cover disc which does not have parallel surfaces can be such that the area of the cylinder jacket through which flow takes place remains at least approximately constant for every radius between blade outlet edges and outlet nozzle 20.

The grinding and classifying parameters are preferably chosen such that the ground product has
- a $d_{50}$-value of from 150 to 2000 nm, preferably of from 200 to 1500 nm, more preferably of from 250 to 1200 nm, most preferably of from 300 to 900 nm and particular preferred of from 350 to 600 nm;
- a $d_{90}$-value of from 500 to 7000 nm, preferably of from 700 to 6500 nm, more preferably of from 800 to 6000 nm, most preferably of from 900 to 6000 nm and particular preferred of from 1000 to 5000 nm.

Particular preferably, the diameter of the grinding nozzles is of from 2 to 11 mm, the nozzle type is Laval, the number of nozzles is of from 3 to 5, the internal mill pressure is of from 0.8 to 1.5 bar (abs.), the grinding medium entry pressure is of from 12 to 300 bar (abs.), the grinding medium entry temperature is of from 190 to 600° C., the grinding medium mill exit temperature is of from 105 to 250° C., the classifier speed is of from 100 to 6000 $\min^{-1}$, the outlet port diameter (immersed pipe diameter) is of from 100 to 500 mm.

In a very particular preferred process, a solution of a multivalent cation for example $Al^{3+}$, especially preferably of a bivalent cation, most preferably of a cation selected from the group consisting of $Mg^{2+}$, $Ca^{2+}$, $Sr^{2+}$, $Ba^{2+}$, and $Zn^{2+}$ is added during the milling step. Said additives are added via a two fluid nozzle.

The precipitated silica described functions as thixotropic agents which when added to liquid systems, preferably unpolar and intermediate-polar systems, particular preferably UPE formulations, generally will change the slope of its rheology curve, preferably without undesirably degrading the properties of the cured composition.

Especially preferred liquid systems of comprising the precipitated silica of the invention include unsaturated polyesters, gel coats, laminate resins, epoxies, PVC-plastisol, polysulfide, acrylics, silicones, paints and coatings, inks, adhesives, sealants, plant protection systems, color concentrates, cosmetics, toothpaste, cable gels, and plasticizers.

In this regard, the amount of precipitated silica in the liquid system of the present invention is not specifically limited, and can be varied according to the results desired. Without being limiting, typical amounts include from 0.1 to 15 wt. %, preferably 0.5 to 10 wt. %, and more preferably 0.5 to 2.5 wt. % of the total weight of the liquid composition, including 1, 2, 3, 4, 5, 6, 7, 8, 9, 10, 11, 12, 13, 14 and 15% as well as all values and subranges therebetween.

Precipitated silica products employed in the present invention include synthetic silicon dioxide materials prepared by the acidulation of an alkali metal silicate such as sodium silicate with an acidifier such as sulfuric acid under controlled reaction conditions. Precipitated silica differ from pyrogenic silica, also called fumed silica, which are well known in the art and are prepared by the hydrolysis of silicon tertrachloride vapor in a flame of hydrogen and oxygen at elevated temperature. Pyrogenic silica are sold commercially under tradenames such as Cab-o-Sil® and Aerosil®.

Besides the precipitated silica described above, the liquid systems of the present invention may optionally comprise at least one inorganic and/or organic pigment. Representative pigments impart coloration (including white or black coloration) and opacity to the disclosed liquid compositions, and usually are obtained in the form of a paste or other dispersion of the dry pigment in a compatible carrier, e.g., at about 15 to about 40 wt. % dry pigment solids based on the dispersion weight. The pigment dispersion may also contain wetting agents, dispersing agents, and inhibitors, in minor amounts. Suitable carrier resins include unsaturated polyester resins, saturated polyester resins, urethane diacrylates, acrylic silicones, or other carriers that will be familiar to those skilled in the art. The pigment dispersion may for example be prepared by adding the pigment and other ingredients to the carrier resin, then mixing in a grinding machine. Representative pigments include treated or untreated organic or inorganic pigments and mixtures thereof, such as titanium dioxide, carbon black, iron oxide black, phthalo blue, phthalo green, quinacridone magenta, LF orange, arylide red, quinacridone red, red oxide, quinacridone violet, LF primrose yellow, yellow oxide and other pigments that will be familiar to those skilled in the art. Suitable pigments are commercially available from a variety of suppliers including Ciba Specialty Chemicals, Sun Chemical, Clariant and Cabot Corp. The pigments are preferably used in an amount sufficient to provide an opaque cured coating at the desired thickness level, e.g., at pigment dispersion weights of about 1 to about 30 wt. %, about 5 to about 25 weight or about 5 to about 20 wt. % of the liquid composition.

In addition, the liquid compositions may optionally comprise at least one other extender filler like clay, ground limestone, mica, talc, aluminum trihydrate, barium sulfate, standard precipitated silica, fumed silica and the like. Said extender fillers may also contribute to impart thixotrophy to the gel coats of the invention. Even though is has to be emphasized, that liquid compositions of the invention comprising a precipitated silica having physico-chemical properties as disclosed above can be produced without additional extender fillers without a decrease in their performance, it is nevertheless possible to add such additional fillers if desired. These amounts of such fillers are not limited, although they are typically added in amounts of from about 5 to about 40 wt. % of the gel coat composition.

In case the liquid compositions of the invention are marine gel coating compositions, they preferably are sufficiently free of water-attackable (e.g., water-accessible and water-susceptible) extender filler so that the cured coating will not exhibit blushing after long-term immersion in water. Typical extender fillers in that case include chopped or milled fiberglass, talc, silicone dioxide, titanium dioxide, wollastonite, mica, alumina trihydrate, clay, calcium carbonate, magnesium carbonate, barium carbonate, calcium sulfate, magnesium sulfate and barium sulfate. While small amounts of water-attackable extender filler may be tolerated, preferably no more than about 2 wt. %, and more preferably no more than about 1 wt. %, including no more than 0.8, 0.5, 0.3 and 0.1 wt. % water-attackable extender filler is employed in the gel coat composition.

Any variety of unsaturated polyester resins may be employed in the disclosed liquid compositions. Some representative unsaturated polyester resins are described in U.S. Pat. Nos. 4,742,121, 5,567,767, 5,571,863, 5,688,867, 5,777, 053, 5,874,503 and 6,063,864 and in PCT Published Application Nos. WO 94107674 A1, WO 00123495 A1 and WO 031101918A2. Polyester resins may be prepared from the condensation of one or more carboxylic acids (such as mono, di- or poly-functional unsaturated or saturated carboxylic acids) or their derivatives (such as acid anhydrides, C, alkyl esters, etc.) with one or more alcohols (including monofunctional, di-functional and poly-functional alcohols). The carboxylic acid or derivative may for example be a mixture of an unsaturated carboxylic acid or derivative and a saturated carboxylic acid or derivative. The unsaturated carboxylic acids or their derivatives may for example have about 3 to about 12, about 3 to about 8, or about 4 to about 6 carbon atoms. Representative unsaturated carboxylic acids and their derivatives include maleic acid, fumaric acid, chloromaleic acid, itaconic acid, citraconic acid, methylene glutaric acid, mesaconic acid, acrylic acid, methacrylic acid, and esters or anhydrides thereof. Representative unsaturated carboxylic acids and their derivatives include maleic, fumaric acids. fumaric esters and anhydrides thereof. An unsaturated carboxylic acid or its derivative may for example be present in an amount from about 20 to about 90 mole percent, about 35 to about 75 mole percent, or about 50 to about 65 mole percent of the acids or acid derivatives used to make the unsaturated polyester resin. The saturated carboxylic acids and their derivatives may for example have from about 8 to about 18, about 8 to about 15, or about 8 to about 12 carbon atoms. Representative saturated carboxylic acids and their derivatives may be aromatic, aliphatic or a combination thereof, and include succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, hexahydrophthalic acid or anhydride, tetrachlorophthalic acid, chlorendic acid or anhydride, dodecanedicarboxylic acids, nadic anhydride, cis-5-norbornene-2,3-dicarboxylic acid or anhydride, dimethyl-2,6-naphthenic dicarboxylate, dimethyl-2,6-naphthenic dicarboxylic acid, naphthenic dicarboxylic acid or anhydride and 1,4-cyclohexane dicarboxylic acid. Other representative carboxylic acids include ethylhexanoic acid, propionic acid, trimellitic acid, benzoic acid, 1,2,4-benzenetricarboxylicacid, 1,2,4,5-benzenetetracarboxylic acid and anhydrides thereof. Representative aromatic saturated carboxylic acids include o-phthalic acid, isophthalic acid and their derivatives. Representative aliphatic saturated carboxylic acids include 1,4-cyclohexane dicarboxylic acid, hexahydrophthalic acid, adipic acid and their derivatives. The saturated carboxylic acids or their derivatives may for example be present in an amount from about 10 to about 80 mole percent, about 25 to about 65 mole percent, or about 35 to about 50 mole percent of the acids or acid derivatives used to make the unsaturated polyester resin. Also, an aromatic carboxylic acid may for example be present in an amount from 0 to 100 percent, from 0 to about 50 percent, or from 0 to about 25 percent of the saturated acids or acid derivatives used to make the unsaturated polyester resin, and an aliphatic carboxylic acid may for example be present in an amount from 0 to 100 percent, from about 50 to 100 percent, or from about 75 to 100 percent of the saturated acids or acid derivatives used to make the unsaturated polyester resin.

Representative alcohols for use in making unsaturated polyester resins include alkanediols and oxaalkanediols such as ethylene glycol, 1,2-propylene glycol, propane-3-diol, 1,3-butylene glycol, butene-1,4-diol, hexane-1,6-diol, diethylene glycol, triethylene glycol, polyethylene glycol, cyclohexane-1,2-diol, 2,2-bis-(p-hydroxycyclohexyl)-propane, 5-norbornene-2,2-dimethylol, 2,3-norbornene diol, cyclohexane dimethanol, and the like. Alcohols having a neo-structure such as 1,2-propanediol, 2-methyl 1,3-propanediol, 2,2-dimethyl heptanediol, 2,2-dimethyl octanediol, 2,2-dimethyl-1,3-propanediol(nle opentylglycol), pentaerythritol, dipentaerythritol, tripentaerythritol, trimethylol propane, di-trimethylol propane, 2,2,4-trimethyl-1,3-pentanediol, 2-butyl-2-ethyl-1,3-propanediol, 3-hydroxy-2,2-dimethylpropyl 3-hydroxy-2,2-dimetphyrolpanate, and the like may be preferred. Monofunctional alcohols may also be used to prepare the unsaturated polyester resin. Representative monofunctional alcohols include benzyl alcohol, cyclohexanol, 2-ethylhexyl alcohol, 2-cyclohexyl ethanol, 2,2-dimethyl-1-propanol and lauryl alcohol. Where a monofunctional alcohol is used, the amount may for example be less than about 10 mole percent, or less than about 5 mole percent of the alcohols used to make the unsaturated polyester resin.

Unsaturated polyester resin may be prepared by esterification techniques that will be familiar to those skilled in the art, for example by using catalysts (e.g., esterification or transesterification catalysts) that will likewise be familiar to those skilled in the art. The esterification process is typically carried out until the polyester attains an acid number corresponding to the desired molecular weight. For example, the final acid number may be from about 7 to about 30, the number average molecular weight (Mn) may be from about 800 to about 3600, and the weight average molecular weight (Mw) may be from about 1,300 to about 11,000. The acid number may be reduced by increasing the reaction temperature, carrying out the reaction for a longer period of time, or by adding an acid neutralizer as will be familiar to those skilled in the art.

Unsaturated polyester resin may also be formed by reacting an oligoester having a weight average molecular weight of about 200 to about 4000 with a diisocyanate and a hydroxyalkyl(meth)acrylate to provide a urethane acrylate having terminal vinyl groups, as described in the abovementioned U.S. patent application Ser. No. 10/521,225. The urethane acrylate resin may be used as is, or in a mixture with another unsaturated polyester resin such as an aliphatic or aromatic unsaturated polyester resin.

In an UPE composition, while not limited, the unsaturated polyester resin may for example represent about 25 to about 94 wt. %, about 30 to about 89 wt. %, or about 40 to about 79 wt. % of the UPE composition.

Beside of the components disclosed above the liquid compositions of the invention may comprise additional components which are described below.

Reactive diluents may be used. Representative examples include vinylbenzene(styrene monomer), methyl methacrylate (MMA), and non-hazardous air pollutant (non-HAPS) reactive diluents such as substituted styrenes (e.g., vinyltoluene, para-tertiary-butylstyrene, para-methylstyrene or divinylbenzene); mono-, di-, and poly-functional esters of unsaturated monofunctional acids (such as acrylic acid and methacrylic acid) with alcohols or polyols having from 1 to about 18 carbon atoms; and mono-, di-, and poly-functional esters of unsaturated monofunctional alcohols with carboxylic acids or their derivatives having from 1 to about 18 carbon atoms. Other suitable reactive diluents include, for example, acrylates, methacrylates, phthalates such as diallyl phthalate; A triallylcyanurates; vinyl ethers; and the like. Representative acrylates and methacrylates include butanediol dimethacrylate, trimethylolpropane trimethacrylate, ethylene dimethacrylate (EGDMA), polyethylene glycol dimethacrylate (PEGDMA), polypropylene glycol dimethacrylate (PPGDMA), trimethylol propane trimethacrylate (TMPTMA), tetramethylol propane trimethacrylate, dipropylene glycol dimethacrylate, isodecyl methacrylate, 1,3-butylene glycol dimethacrylate, 2-hydroxy ethyl methacrylate (2-HEMA), 1,6 hexane diol dimethacrylate (HDODMA), trieththylene glycol dimethacrylate (TEGDMA), acetoacetoxyethyl methacrylate (AAEM) and the acrylate counterparts thereof. Mixtures of reactive diluents may be used. Preferred reactive diluents include styrene, methyl methacrylate, vinyltoluene, para-tertiary-butylstyrene, para-methylstyrene, EGDMA, 2-HEMA and mixtures thereof. The reactive diluent may for example represent about 5 to about 50 wt. %, about 10 to about 45 wt. %, or about 20 to about 35 wt. % of the composition.

Another component that may be present is one or more promoters. Representative promoters for use in the UPE compositions are electron donating species that help in the decomposition of an initiator or catalyst and facilitate or speed curing of the gel coat composition at relatively low temperatures, e.g., at temperatures of about 0 to about 30° C. Representative promoters include metal compounds (e.g., cobalt, manganese, potassium, iron, vanadium, copper, and aluminum salts of organic acids); amines (e.g., dimethylaniline, diethylaniline, phenyl diethanolamine, dimethyl paratoluidine, and 2-aminopyridine); Lewis acids (e.g., boron fluoride dihydrate and ferric chloride); bases (e.g., tetramethyl ammonium hydroxide); quaternary ammonium salts (e.g., trimethyl benzyl ammonium chloride and tetrakismethylol phosphonium chloride); sulfur compounds (e.g., dodecyl mercaptan and 2-mercaptoethanol); dimethyl acetoacetamide; ethyl acetoacetate; methyl acetoacetate and mixtures thereof. For example, cobalt salts of organic acids may be used to facilitate the low temperature decomposition of peroxide catalysts and cure of the disclosed gel coat compositions. Preferred promoters include cobalt octanoate, potassium octanoate, dimethyl acetoacetamide, ethyl acetoacetate, methyl acetoacetate and mixtures thereof. The promoters typically are used in an amount of about 0.05 to about 3 wt. %, or about 0.05 to about 2 wt. % of the UPE composition.

Another component that may be present is one or more inhibitors. Inhibitors help prolong or maintain shelf life for the uncured gel coat composition and include free-radical inhibitors or scavengers such as quinones (e.g., hydroquinone (HQ), toluhydroquinone (THQ), mono-tertiarybutyl hydroquinone (MTBHQ), di tertiary-butyl hydroquinone (DTBHQ), napthaquinone (NQ), and monomethyl ether hydroquinone (MEHQ)), butylated hydroxy toluene (BHT), tertiary butyl catechol (TBC), and the like. The inhibitor amount may for example be from about 0.01 to about 0.5 wt. %, from about 0.01 to about 0.3 wt. %, or from about 0.01 to about 0.1 wt. % of the composition.

The liquid composition may also include other adjuvants that will be familiar to those skilled in the art, including suppressants, surface tension agents, air release agents, initiators and catalysts. Suppressants may reduce volatile organic emissions, and include materials described in the above-mentioned U.S. Pat. No. 5,874,503. When employed, the suppressant amount may for example be up to about 2 wt. %, up to about 1.5 wt. %, or from about 0.1 to about 1 wt. % of the composition.

Surface tension agents may be added to lower surface tension at the surface of the cured liquid system, and include silicones such as dimethyl silicones, liquid condensation products of dimethylsilane diol, methyl hydrogen polysiloxanes, liquid condensation products of methyl hydrogen silane diols, dimethylsilicones, aminopropyltriethoxysilane and methyl hydrogen polysiloxanes, and fluorocarbon surfactants such as fluorinated potassium alkyl carboxylates, fluorinated alkyl quaternary ammonium iodides, ammonium perfluoroalkyl carboxylates, fluorinated alkyl polyoxyethylene ethanols, fluorinated alkyl alkoxylates, fluorinated alkyl esters, and ammonium verfluoroalkyl sulfonates. Representative commercially available surface tension agents include BYK-306™ silicone surfactant (from BYK-Chemie USA, Inc.), DCIOO and DC200 silicone surfactants (from Dow corning co,), the MODAFO series of additives (from Solutia, Inc) and SF-69 and SF-99 silicone surfactants (from GE silicones Co,). When employed, the surface tension agent amount may for example be up to about 1 wt. %, or from about 0.01 to about 0.5 wt, % of the composition.

Another component that may be present is one or more air release agents. Air release agents may assist in curing the liquid composition without entrapping air and thereby causing weakness or porosity. Typical air release agents include silicone or non-silicone materials including silicone defoamers, acrylic polymers, hydrophobic solids, and mineral oil based paraffin waxes. Commercially available air release agents include BYK-066, BYK-077, BYK-500, BYK-501, BYK-515, and BYK-555 defoamers (from BYK-Chemie USA, Inc.). When used, the air release agent amount may for example be up to about 1.5 wt. %, up to about 1 wt. %, or from about 0.1 to about 0.5 wt. % of the gel coat composition. Even though air release additives may be added, it has to be emphasized, that the precipitated silica of the invention show improved air release properties, i.e. the amount of air release additives may be significantly reduced.

Initiators or catalysts may be added to the liquid composition at the time of application to a mold surface or may be latent initiators or catalysts that may be included in the composition as supplied to the end user and are activated during the application process. Representative initiators or catalysts include free-radical catalysts such as peroxide catalysts (e.g., benzoyl peroxide, methyl ethyl ketone peroxide, cumene hydroperoxide, and the like), azoalkane catalysts and commercially available initiators or catalysts such as Luperox™ DDM9 and DHD9 catalyst (from Arkema), HIGH POINT™ 90 catalyst (from Chemtura) and CADOX™ L50a catalyst (from Akzo Nobel). Representative radiationactivated or heat-activated initiators or catalysts include IRGACURE™ 819 initiator (from Ciba Specialty Chemicals) and cumene hydroperoxide. When used, the initiator or catalyst amount may for example be about 0.5 to about 3 wt. %, about 1 to about 2.5 wt. %, or about 1.2 to about and 2 wt. % of the unsaturated polyester resin weight.

The liquid compositions of the present invention may be produced by combining at least one precipitated silica of the invention with at least one polymer compound.

In a preferred embodiment the invention a liquid composition may be prepared for example by blending the unsaturated polyester resin with suitable precipitated silica and the remaining ingredients in any convenient order.

If desired, some or all of the reactive diluents may be added at the completion of blending to yield a mixture having a preferred viscosity (e.g., a viscosity of about 2,000 to about 10,000 centipoise, about 3,000 to about 8,000 centipoise, or about 3,500 to about 5,000 centipoise as measured using a BROOKFIELD viscometer from Brookfield Engineering Laboratories and Spindle No. 4 at 25' C.). The promoter amount may be adjusted or inhibitors may be added or adjusted to obtain a gel coat composition having a desired gel and cure time.

The present invention further provides products/articles coated with the liquid of the present invention. Coating can be partial or complete. In particular articles comprising a UPE coat of the present invention in its outermost layer which is exposed to the environment are preferred.

The products/articles to be coated include molded articles made of plastic or other materials. In particular the coated, molded articles, optionally fiber-reinforced, are typically are made by spreading a liquid composition over the surface of a mold having a surface corresponding to the article in negative relief. After cure, the liquid composition becomes the outermost layer of the molded article and might become exposed to the environment. The liquid composition is spread across the mold surface by any one of a number of techniques (e.g., brushing, hand lay-up, or spraying) and usually as a relatively thick layer, e.g., up to about a 0.8 mm thick wet coating.

The liquid composition may applied to a mold surface in one or more layers and at least partially cured using techniques that will be familiar to those skilled in the art, layer by layer if desired, including the above-mentioned open mold or closed mold processes. The layer or layers of the coat composition may each for example have a wet thickness of about 0.05 to about 0.8 mm.

A variety of strengthening plastic support materials may be formed behind the liquid composition in one or more layers using techniques that will be familiar to those skilled in the art. Representative strengthening plastic support materials include fiber-reinforced plastics (made e.g., using fiberglass cloth or fiberglass roving), carbon fiber composites, reinforced or unreinforced surface molding compounds and other reinforced or unreinforced plastics such as reinforced polyesters or reinforced epoxies. The strengthening plastic support overall thickness before cure may for example be about 5 mm to about 125 mm.

If desired, one or more intervening layers such as a barrier coat, skin coat or print blocker may be applied between the coating composition and the strengthening plastic support. Suitable intervening layer materials will be familiar to those skilled in the art, and include vinyl esters, polyesters and epoxy resins. The wet thickness of such intervening layers will also be familiar to those skilled in the art, and may for example be about 0.1 to about 3 mm.

Typical examples for products/articles coated with the liquid compositions of the invention comprise parts for boats, wind mills, swimming pools, tub and shower, sanitary ware, tanks, housing, corrosion resistant applications such as pipes, tanks, ducts, fume stacks, build panels, ships, e.g. Coast Guard Ships, electrical parts, aircraft and electronical components and other parts subjected light, water, solvents or high temperatures, automotive and application appearance parts and the like. Particular preferred are products/articles exposed to water. Very particular preferred are products/articles exposed to water for a very long time, e.g. at least one week, without interruption.

Having generally described this invention, a further understanding can be obtained by reference to certain specific examples which are provided herein for purposes of illustration only, and are not intended to be limiting unless otherwise specified.

EXAMPLES

The reaction conditions and the physical/chemical data of the precipitated silica used in the gel coats of the invention were determined by the following methods:

Determination of the BET Surface Area

The BET surface area was measured following ISO 9277. The procedure was used to determine the specific N2 surface area of silicas and silicates according to the BET procedure. With the method described here the measured value was determined by cryogenic adsorption of nitrogen at well defined partial pressures. The analysis was accomplished as multipoint determination and showed in the partial pressure range (p/p0) of 0.05-0.2 with measuring of altogether 5 points a linear behavior.

Determination of the Loss on Drying (LOD)

Following ISO 787-2 the loss on drying was determined in silicas and silicates.

A weighing bottle with the stopper removed was heated in the oven at 105° C. for at least 1 h. After cooling in the dessicator and inserting the stopper it was weighed (at least) to the nearest 0.01 g on a precision balance. 10+1 g of the sample were spread in a uniform layer on the bottom of the weighing bottle. The stopper was inserted again and the filled weighing bottle was weighed with a accuracy of 0.01 g ($m_{sp}$). The weighing bottle was opened cautiously and heated with the stopper (removed) in the oven at 105+2° C. for 2 h. Thereafter the weighing bottle was slowly closed with the stopper and allow to cool in a dessicator. The weighing bottle was weighed with an accuracy of 0.01 g ($m_{LOD}$). The test result was given with 1 decimal place; values of as less than 0.1% were reported as "<0.1".

$$LOD \text{ in } [\%] = \frac{(m_{sp} - m_{LOD}) \times 10}{m_{sp}}$$

$m_{sp}$=weight of original sample [g],
$m_{LOD}$=weight of residue after loss on drying [g].

Determination of Loss on Ignition (LOI)

1 g of silica original sample material was weighed accurately ($m_{sp}$) in a tared platinum crucible and was heated at 1000° C. for 2 h. After cooling down in a desciccator in presence of $P_2O_5$ the crucible was weighed again. The weight after loss on ignition ($m_{LOI}$) was calculated.

The loss of ignition (LOI) was given by the equation:

$$LOI \text{ in}[\%] = \frac{m_{sp} - m_{LOI}}{m_{sp}} \times 100$$

$m_{sp}$=weight of original sample [g],
$m_{LOI}$=weight of sample after loss on ignition [g].

Determining the Modified Tapped Density

With the "conventional" tapped density determination of DIN EN ISO 787-11, the result can be falsified by the fact that the silica had already undergone preliminary compaction in the course, for example, of being packed. In order to rule this out, a "modified tapped density" was determined for the silicas of the present invention.

A porcelain suction filter (nominal size 110, diameter=12 cm, height=5.5 cm) fitted with a circular filter (e.g. type 598, Schleicher+Schull) was filled loosely with silica to approximately 1 cm from the top edge, and was covered with elastic film (Parafilm®). The shape and dimensions of the elastic film were to be selected such that it finishes very closely or completely flush with the edge of the porcelain suction filter unit. The unit was mounted on a suction bottle and then a vacuum of −0.7 bar was applied for a period of 5 minutes. In the course of this operation, the silica was compacted uniformly by virtue of the film under suction. Then air was cautiously readmitted and the resulting silica plaque was removed from the filter unit by being tipped forcefully into a porcelain dish.

The slightly pre-comminuted material was redispersed uniformly (in the manner of a silica/air aerosol) via a centrifugal mill (ZM1, Retsch, 0.5 mm screen insert, speed setting 1, without cyclone, without internal funnel insert) with an internal collecting dish (the silica (starting material) was introduced slowly—spatula by spatula—into the mill feed; the internal product collection dish should never become completely full). During this operation the power consumption of the mill should not exceed 3 amperes. This operation was less a conventional grinding than a defined loosening of the silica structure (of air-jet-milled silicas, for example), since the energy input here was substantially weaker than in the case of jet milling.

5 g of the resulting material were weighed out to an accuracy of 0.1 g into the 250 ml volumetric cylinder of the jolting volumeter (STAV 2003 from Engelsmann). In a method based on DIN ISO 787-11, after jolting 1250 times, the resulting volume of the silica, in ml, was read off on the scale.

Determination Loss on Ignition and of the $SiO_2$ Content 1 g of silica original sample material was weighed accurately ($m_{sp}$) in a tared platinum crucible and was heated at 1000° C. for 2 h. After cooling down in a desiccator in presence of $P_2O_5$ the crucible was weighed again. The weight after loss on ignition ($m_{GV}$) was calculated.

The residue after ignition was wetted with de-ionized water, 2 ml $HClO_4$ (70% p.a.) and 25 ml HF (40% p.a.) were added. The sample was slowly heated until strong formation of smoke will be observed. Further 2 ml HF were added and the sample was dried off again. The residue was heated at 1000° C. for 1 h. After cooling down in a desiccator in presence of $P_2O_5$ the residue was weighed ($m_{HF}$).

The $SiO_2$ content was given by the equation:

$$LOI \text{ in } [\%] = \frac{m_{GV} - m_{sp}}{m_{sp}} \times 100$$

$$SiO_2 \text{ content in } [\%] = \frac{m_{GV} - m_{HF}}{m_{GV}} \times 100$$

$m_{sp}$=weight of original sample [g],
$m_{GV}$=weight of sample after loss on ignition [g],
$m_{HF}$=weight of sample after treatment with HF [g].

Determination of the $Na_2O$ Content

The $Na_2O$ content was measured by a flame atomic adsorption spectrometer.

3.0 g of the original sample were weighed accurately in a platinum cup. The sample was wetted with de-ionized water, 5 ml sulphuric acid (1:1) and 25 ml hydrofluoric acid were added. The sample was slowly heated until strong formation of smoke will be observed. In the case that residual organic material as dark residue was still observed, the sample was after-treated with $H_2O_2$. The residue was then diluted with de-ionized water and dissolved. The solution was filled up to 50 ml in a graduated sample-tube.

0.2 ml of this solution were transferred into a second tube, added with 2.5 ml CsCl solution (w(Cs=10%) and filled up to 50 ml with de-ionized water.

Further solutions with Na content of 0.1 mg/l, 0.2 mg/l and 0.3 mg/l and a blank solution were produced for calibration.

All solutions were measured by flame atomic adsorption spectroscopy at wavelength 589 nm.

The result of this measurement was the Na content in the measurement solution. The $Na_2O$ content was given by the equation:

$$Na_2O \text{ content in } [\%] = \frac{c_{Na} \times V_{sp} \times D_F \times 1.348}{\left(W - \frac{LOI}{100} \times W\right) \times 1000} \times 100$$

$c_{Na}$=Na content measured in the measurement solution [mg/l],
$V_{sp}$=Volume [l]=0.05,
$D_F$=Dilution factor=250,
W=weighted sample [g],
LOI=Loss on ignition [%],
1.348=stoichiometric factor (Na->$Na_2O$).

Determination of the Conductivity

Following ISO 787-14 the method was used to determine the electrical resistivity of aqueous silica suspensions and extracts, respectively.

With appropriate amounts of the sample and distilled water a suspension with a content of 5% (m/m) was produced. Then the temperature of the suspension was adjusted to 21° C. in a thermostat and the electrical conductivity was measured by means of a conductometer (Metrohm conductometer 660 or LF 530 WTW) and a conductivity cell (Metrohm, model 6.0908.110).

15 g of the sample being investigated and 285 g of de-ionized water were weighted into a previously tared beaker by means of a precision balance. The suspension in the beaker was stirred thoroughly covered by a watch glass for 5 minutes (±10 sec) at room temperature by means of a magnetic stirrer with bar. Approximately 40 ml of the suspension were transferred into a 50 ml beaker and allowed to adjust at 21±0.5° C. in a thermostate. The reference temperature 21° C. was also to adjust at the conductometer.

Another 40 ml of the suspension were given in a second 50 ml beaker and the conductivity cell was prerinsed with the suspension by repeated dipping into this suspension. Then the conductivity cell was immersed into the measuring suspension adjusted to 21±0.5° C. The measuring value read from the conductivity meter corresponds with the electric conductance of the suspension at 21° C.

The result of the determination was the electrical conductivity in μS/cm of a 5% suspension (m/m) referring to a temperature of 21° C. The result was rounded to 10 μS/cm if the conductivity was >=200 μS/cm. If the conductivity was <200 μS/cm it was rounded to 1 μS/cm.

Determining the Silanol Group Density

First of all the moisture content of the silica sample was determined in accordance with the section "Determining the Moisture Content or Loss on Drying". Thereafter 2-4 g of the sample (to an accuracy of 1 mg) were transferred to a pressure-tight glass apparatus (glass flask with dropping funnel) with a pressure measurement means attached. In this apparatus it was dried under reduced pressure (<1 hPa) at 120° for 1 h. At room temperature then, approximately 40 ml of a degassed 2% strength solution of $LiAlH_4$ in diglyme was added dropwise from the dropping funnel. If appropriate, further solution was added dropwise until no further increase in pressure was observed. The increase in pressure as a result of the hydrogen evolved when the $LiAlH_4$ reacts with the silanol groups of the silica was determined by way of pressure measurement (with the volume known as a result of calibration of the apparatus prior to measurement) to an accuracy of ≦1 hPa. From the increase in pressure it was possible, by calculation using the general gas equation, to work back to the silanol group concentration of the silica, taking into account the moisture content of the silica. The influence of the vapor pressure of the solvent should be corrected correspondingly. The silanol group density was calculated as follows:

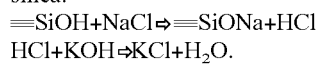

Sears Number Determination

The modified Sears number (hereinafter Sears number $V_2$) was a measure of the number of free silanol groups and can be determined via titration of silica with potassium hydroxide solution in the range from pH 6 to pH 9.
The determination method was based on the following chemical reactions, and
≡SiOH was intended to symbolize a silanol group of the silica:
≡SiOH+NaCl⇨≡SiONa+HCl
HCl+KOH⇨KCl+$H_2O$.

Method 10.00 g of a pulverulent, spherical or granular silica with moisture level of 5±1% were uniformly comminuted for 60 seconds, using an IKA M 20 universal mill (550 W; 20 000 rpm). If appropriate, the moisture content of the starting substance had to be adjusted via drying at 105° C. in a drying cabinet, or uniform wetting, and the comminution process repeated. 2.50 g of the resultant treated silica were weighed out at room temperature into a 250 ml titration vessel and mixed with 60.0 ml of methanol (analytical grade). Once the specimen had been completely wetted, 40.0 ml of deionized water were added, and an Ultra-Turrax T 25 stirrer (KV-18G stirrer shaft, diameter 18 mm) was used for dispersion for 30 seconds with rotation rate 18 000 rpm. 100 ml of deionized water were used to flush the specimen particles adhering to the edge of the vessel and to the stirrer into the suspension, and the temperature of the mixture was controlled to 25° C. in a waterbath with thermostat.

The pH measurement device (Knick 766 Calimatic pH meter with temperature sensor) and the pH electrode (Schott N7680 combination electrode) were calibrated by using buffer solutions (pH 7.00 and 9.00) at room temperature. The pH meter was first used to measure the starting pH value of the suspension at 25° C., and then, as a function of the result, potassium hydroxide solution (0.1 mol/l) or hydrochloric acid solution (0.1 mol/l) was used to adjust the pH value to 6.00. A dynamic titration method was selected with the following parameters: incremental titration volume $V_{min}$=0.05 ml to $V_{max}$=1.0 ml; waiting time between volume additions $t_{min}$=2.0 s to $t_{max}$=20.0 s. Consumption of KOH solution or of HCl solution in ml to pH 6.00 was $V_1'$. 20.0 ml of sodium chloride solution (250.00 g of NaCl (analytical grade) made up to 1 l with deionized water) were then added. 0.1 mol/l of KOH was then used for titration to a pH value of 9.00. Consumption of KOH solution in ml to pH 9.00 was $V_2'$.

The volumes $V_1'$ and, respectively, $V_2'$ were then first standardized to the theoretical starting weight of 1 g, and were multiplied by 5, to give $V_1$ and the Sears number $V_2$ in the units ml/(5 g).

IR Determination

By means of IR spectroscopy it was possible to ascertain the different kinds of SiOH groups (isolated, bridged, +$H_2O$). To determine the intensities of the different silanol groups, the silicas were subjected to measurement in the form of powder layers. The absorbance values of the different silanol groups were divided (standardized) by the absorbance value of the SiO combination vibration band at 1870 $cm^{-1}$.

The IR-spectroscopic determination takes place by means of a Bruker IFS 85 FR-IR spectrometer. Measurement takes place using a transparent NaCl monocrystal disc (round d=25 mm, h=5 mm) from K. Korth, Kiel, Germany, a 0.5 mm Teflon spacer and a mount for the discs. The spacer was placed on one clean, polished transparent NaCl monocrystal disc. The sample material was dusted on between the spacer and was covered with a further clean, polished transparent NaCl monocrystal disc; there must be no air bubbles included. The two transparent NaCl monocrystal discs with the powder layer were clamped into the sample mount. The sample mount was brought into the IR beam path and the sample chamber was closed. Prior to the measurement, the sample chamber was flushed with air cleaned to remove steam and carbon dioxide. In the alignment mode an "Align" was carried out, and measurement was commenced.

Measurement was carried out using the following parameters:

| | |
|---|---|
| Resolution: | 2 $cm^{-1}$ |
| Scanner speed: | 6; 10.51 Hz |
| Measuring range: | 4500 $cm^{-1}$ to 100 $cm^{-1}$ |
| Apodization function: | triangular |
| Number of scans: | 128. |

The spectrum was expressed, in the wave number range from 4000 to 1400 $cm^{-1}$, in continuous wave numbers.

Figure 6:
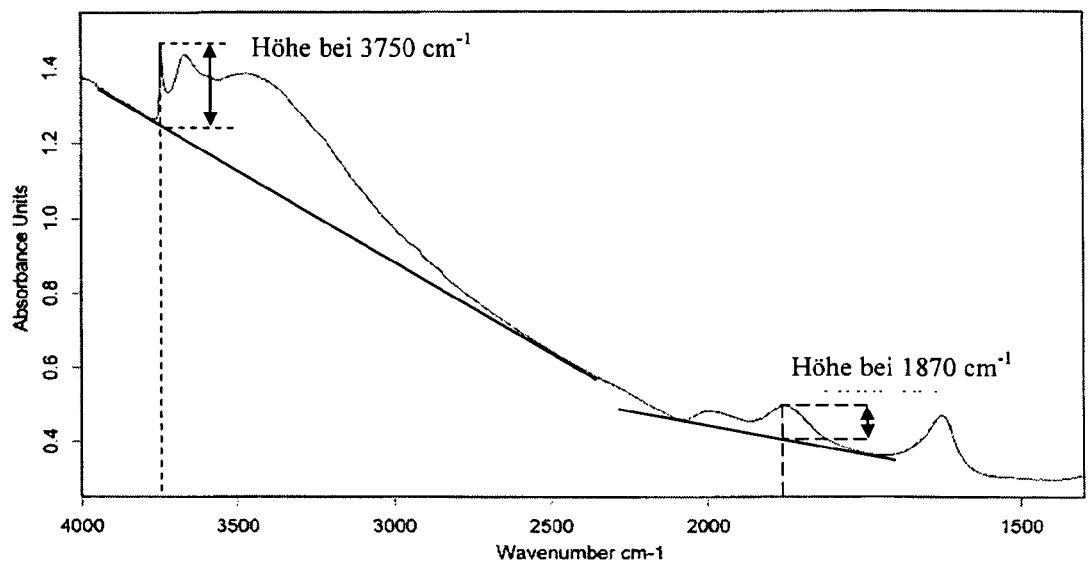
FIG. 6 shows the determination of the $SiOH_{isolated}$ absorbance ratio.

The $SiOH_{isolated}$ absorbance ratio was determined as follows (FIG. 6):

First of all, two baselines were set. This was done by applying two tangents to the absorption plot. The first tangent (1st baseline) touches the absorption plot first in the region from 4000 $cm^{-1}$ to 3800 $cm^{-1}$ and secondly in the region from 3000 $cm^{-1}$ to 2100 $cm^{-1}$. It should be ensured that the tangent does not intersect the absorption plot either in the region from 4000 $cm^{-1}$ to 3800 $cm^{-1}$ or in the region from 3000 $cm^{-1}$ to 2100 $cm^{-1}$. The second tangent (2nd baseline) touches the absorption plot first in the region from 2200 $cm^{-1}$ to 2000 $cm^{-1}$ and secondly in the region from 1850 $cm^{-1}$ to 1650 $cm^{-1}$. It should be ensured that the tangent does not intersect the absorption plot either in the region from 2200 $cm^{-1}$ to 2000 $cm^{-1}$ or in the region from 1850 $cm^{-1}$ to 1650 $cm^{-1}$.

After the baselines have been set, a perpendicular line was taken down from the maximum of the bands in question (3750 and 1870 $cm^{-1}$) to the respective baseline, and a measurement was made with the respective heights from the maximum to the baseline, in mm. A ratio was formed as follows:

$$\text{Absorption ratio}(SiOH_{isolated}) = \frac{\text{height from maximum to base line in mm at 3750 } cm^{-1}}{\text{height from maximum to base line in mm at 1870 } cm^{-1}}$$

For each sample six IR spectra were recorded, measurement taking place in each case with new sample material. Each IR spectrum was evaluated five times in accordance with the procedure described above. The absorbance ratio ($SiO_{isolated}$) was reported, finally, as the average value of all the evaluations.

Determining pH

The pH of the silica, as a 5% by weight aqueous suspension, was determined at room temperature in a method based on DIN EN ISO 787-9. In contrast to the specifications of the aforementioned standard, the initial masses were changed (5.00 g of silica to 100 ml of deionized water).

Determining the Particle Size Distribution by Means of Laser Diffraction

The particle distribution was determined in accordance with the principle of laser diffraction on a laser diffractometer (Horiba, LA-920).

First of all the silica sample was dispersed in 100 ml of water without additional dispersing additives in a 150 ml glass beaker (diameter: 6 cm) in such a way as to give a dispersion having a weight fraction of 1% by weight $SiO_2$. This dispersion was then dispersed using an ultrasonic probe (Dr. Hielscher UP400s, Sonotrode H7) for a duration of 5 minutes intensely (300 W, without pulsing). For this purpose the ultrasound probe was mounted such that its lower end was immersed to a distance of approximately 1 cm above the base of the glass beaker. Immediately following the dispersing operation the particle size distribution of a sample of the ultrasonicated dispersion was determined using a laser diffractometer (Horiba LA-920). For the evaluation, using the standard software supplied with the Horiba LA-920, a refractive index of 1.09 was selected.

All measurements take place at room temperature. The particle size distribution and also the relevant variables such as, for example, the particle size $d_{50}$ and $d_{90}$ were automatically calculated and depicted in graph form by the instrument. Attention should be paid to the notes in the operating instructions.

Example 1

The commercially available precipitated silica Sipernat 160, from Evonik Degussa GmbH, physico-chemical data see Table 1, was subjected to ultrafine grinding on a steam-operated fluid-bed opposed-jet mill at a superatmospheric pressure. Details of the grinding system (mill) and of the grinding method used was given in the description above.

In preparation for actual grinding with superheated steam, a fluid-bed opposed-jet mill as shown in FIG. 1, with an integrated dynamic pneumatic classifier as shown in FIGS. 2 and 3, was first heated via the two heating openings or nozzles 5a (of which only one was shown in FIG. 1), which were charged with hot compressed air at 10 bar and 160° C., until the mill exit temperature was approximately 105° C.

For the separation of the ground material, a filter system was connected downstream of the mill (but not shown in FIG. 1), its filter housing being heated in the lower third indirectly via attached heating coils by means of 6 bar saturated steam, likewise for the purpose of preventing condensation. All of the apparatus surfaces in the region of the mill, the separating filter, and the supply lines for steam and hot compressed air have special insulation.

After the heating temperature had been reached, the supply of hot compressed air to the heating nozzles was shut off and the charging of the three grinding nozzles with the grinding medium of superheated steam was commenced.

In order to protect the filter means used in the separating filter, and also in order to set a defined level of residual water in the ground material (see Table 1), water was introduced in the starting phase and during grinding, into the grinding chamber of the mill, via a two-fluid nozzle operated with compressed air, as a function of the mill exit temperature. Details of the milling configuration were given in Table 2.

Product feed was commenced when the abovementioned operational parameters were constant. The feed quantity was regulated as a function of the current flow of the classifier engine. The current flow regulates the feed quantity such that it was not possible to exceed approximately 70% of the nominal current flow.

The introduction member (4) which functions here was a speed-regulated bucket wheel which meters the feed material from a reservoir container via a cyclical lock, which serves as a barometric endpoint, into the grinding chamber, which was at superatmospheric pressure.

The coarse material was comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness was sufficient enter along with the grinding steam into the fines exit, and from there they pass into the downstream separating system, while particles which were too coarse pass back into the grinding zone and were subjected to a repeat comminution. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

The material was ground to the particle size defined in Table 3 by the $d_{50}$ and the $d_{90}$ value.

Examples 2a and 2b

In example 2a, the commercial available precipitated silica Sipernat 22, from Evonik Degussa GmbH, physico-chemical data see Table 1, was subjected to ultrafine grinding on a steam-operated fluid-bed opposed-jet mill at a superatmospheric pressure of about 38 bar and in example 2b the commercial available precipitated silica YH 350 of DWS, Nanping, China, physico-chemical data see Table 1. Details of the grinding system (mill) and of the grinding method used was given in the description above.

In preparation for actual grinding with superheated steam, a fluid-bed opposed-jet mill as shown in FIG. 1, with an integrated dynamic pneumatic classifier as shown in FIGS. 2 and 3, was first heated via the two heating openings or nozzles 5a (of which only one was shown in FIG. 1), which were charged with hot compressed air at 10 bar and 160° C., until the mill exit temperature was approximately 105° C.

For the separation of the ground material, a filter system was connected downstream of the mill (but not shown in FIG. 1), its filter housing being heated in the lower third indirectly via attached heating coils by means of 6 bar saturated steam, likewise for the purpose of preventing condensation. All of the apparatus surfaces in the region of the mill, the separating filter, and the supply lines for steam and hot compressed air have special insulation.

After the heating temperature had been reached, the supply of hot compressed air to the heating nozzles was shut off and the charging of the three grinding nozzles with the grinding medium of superheated steam was commenced.

In contrast to example 1, a $MgSO_4 * 7H_2O$-Solution (20-wt %) and $NH_3$ was added during milling in examples 2 and 3.

In order to protect the filter means used in the separating filter, and also in order to set a defined level of residual water in the ground material (see Table 1), water was introduced in the starting phase and during grinding, into the grinding chamber of the mill, via a two-fluid nozzle operated with compressed air, as a function of the mill exit temperature.

The mill configurations are given in Table 2.

Product feed was commenced when the abovementioned operational parameters were constant. The feed quantity was regulated as a function of the current flow of the classifier engine. The current flow regulates the feed quantity such that it was not possible to exceed approximately 70% of the nominal current flow.

The introduction member (4) which functions here was a speed-regulated bucket wheel which meters the feed material from a reservoir container via a cyclical lock, which serves as a barometric endpoint, into the grinding chamber, which was at superatmospheric pressure.

The coarse material was comminuted in the expanding steam jets (grinding gas). Together with the depressurized grinding gas, the product particles ascend in the centre of the mill vessel to the classifying wheel. Depending on the classifier speed and grinding steam quantity which have been set, the particles whose fineness was sufficient enter along with the grinding steam into the fines exit, and from there they pass into the downstream separating system, while particles which were too coarse pass back into the grinding zone and were subjected to a repeat comminution. The discharge of the separated fines from the separation filter into the subsequent silo storage and bagging operation takes place by means of a bucket-wheel lock.

The grinding pressure of the grinding gas that obtains at the grinding nozzles, and the resulting volume of grinding gas, in conjunction with the speed of the dynamic paddle wheel classifier, determine the fineness of the particle-size distribution function and also the upper particle-size limit.

The material was ground to the particle size defined in Table 3 by the $d_{50}$ and the $d_{90}$ value.

TABLE 1

|  |  | Sipernat 160 | Sipernat 22 | YH 350 |
|---|---|---|---|---|
| BET | m²/g | 183 | 189 | 277 |
| pH |  | — | 5.6 | 6.5 | 7.0 |
| Loss on drying | % by weight | 2.9 | 5.9 | 5.1 |
| Loss on ignition | % by weight | 3.2 | 3.8 | 3.8 |
| Sears number | ml/(5 g) | 11.8 | 24.1 | N.D. |
| DBP | ml/100 g | 276 | 272 | 313 |

TABLE 2

|  |  | Example 1 | Example 2a | Example 2b |
|---|---|---|---|---|
| grinding nozzle diameters | mm | 3.2 | 3.2 | 3.2 |
| nozzle type |  | Laval | Laval | Laval |
| number of nozzles | units | 3 | 3 | 3 |
| internal mill pressure | bar(abs.) | 1.144 | 1.136 | 1.147 |
| grinding medium entry pressure | bar (abs.) | 37.0 | 37.2 | 37.0 |
| grinding medium entry temperature | °C. | 348 | 351 | 354 |
| grinding medium mill exit temperature | °C. | 124 | 123 | 113-121 |
| classifier speed | min⁻¹ | 4500 | 4000 | 4500 |
| current flow of the classifier engine | A % | 62 | 62 | 61-62 |
| outlet port diameter (immersed pipe diameter) | mm | 140 | 140 | 140 |
| silica | kg/h | 56 | 103 | 50 |
| MgSO₄*7H2O (20% solution) | kg/h | — | 1.69 | 2.58 |
| NH₃ | l/h | — | 60 | 80 |

TABLE 3

|  |  | Example 1 | Example 2a | Example 2b | Comparative Example 1 | Comparative Example 2 |
|---|---|---|---|---|---|---|
| BET | m²/g | 179 | 187 | 267 | 180 | 142 |
| pH |  | 6.4 | 7.7 | 7.5 | 6.4 | 6.0 |
| Loss on drying | % by weight | 2.8 | 3.8 | 3.4 | 2.8 | 0.5 |
| Loss on ignition | % by weight | 3.0 | 5.2 | 4.4 | 3.0 | 0.9 |
| SiOH$_{isolated}$ absorbance ratio |  | 0.43 | 0.33 | 0.6 | n.d. | 3.17 |
| Silanol group density | SiOH/nm² | 3.800 | 3.23 | 3.46 | 3.45 | 1.988 |
| Modified tapped density | g/l | 26 | 30 | 23 | — | 21 |
| $d_{90}$ value of volume-based particle distribution | µm | 1.07 | 4.843 | 4.743 | 12.4[1] | 5.87 |
| $d_{50}$ value of volume-based particle distribution | µm | 0.385 | 0.592 | 0.592 | 5.3 | n.d. |

[1] d95-value measured via Coulter LS 230, 7'Ultrasound with Vibracell 19 mm sonotrode, 4 cm immersion, Amplitude 80%, 0.5 g Silica/50 ml

Example 3

The precipitated silica according to examples 1, 2a and 2b were used to prepare thixotropic UPE formulations according to the invention. The comparison examples comprise two other precipitated silica products Sipernat® 22LS (comparison example 1) supplied by Evonik Degussa® GmbH and a silica according to example 2 of DE102007004757 (comparison example 2). The properties of the precipitated silica used were summarized in Table 3.

The base resin utilized in the example was Ashland Aropol S570, a lower molecular weight Isophthalic NeoPentylGlycol (ISO NPG) UPE resin, manufactured by Ashland Specialy Chemicals Co., Columbus, Ohio, USA. The polyester polymer was dissolved in 27.9% styrene, a reactive diluent. Silica samples were dispersed in the resin with a 50 millimeter cowles blade by a Dispermat at 5000 RPM for 10 minutes. The milled silica samples were loaded at a 4.0 wt % level. Cobalt promoter, 12% Cobalt Catalyst 510, manufactured by OMG®, Westlake, Ohio, USA, was also used at 0.15 wt %. The cobalt was dispersed by a 50 mm cowles blade at 1000 RPM for 1.0 minute.

The dispersed samples were tested by a grind gauge to determine the largest coarse agglomerate size of the ground silica particles. A resin sample was placed at the top of each channel on the grind gauge with a scale ranging from 0 to 50 micrometers and a flat metal bar was used to pull the sample down the length of the grind scale. Visual reading was recorded on where a line of particles became apparent in each channel. The grind values, taken as both micrometers and Hegman Grind, are summarized in Table 4. All the three finely milled examples displayed similar grind readings that were substantially better than the comparative example.

TABLE 4

Coarse Agglomerate Size (Hegman Grind)

| Example | Coarse Agglomerate Size (μm) | Hegman Grind Reading |
|---|---|---|
| 1 | 10 | 7.0 |
| 2a | 12 | 6.9 |
| 2b | 10 | 7.0 |
| Comparative Example 1 | 47 | 4.3 |

To compare the rheological properties of the thixotropic UPE formulations, a Brookfield DV II+ ProViscometer and RV spindles #3 or #4, depending on sample viscosity, were utilized. Viscosity readings were recorded at 2 and 20 RPM. The thixotropic index (TI) was calculated as the ratio of the viscosity at 2 RPM to that of 20 RPM. The initial viscosity and thixotropic values are detailed in Table 5.

TABLE 5

Initial Brookfield Viscosity and Thixotropic Index

| Silica | Viscosity (cp) @ 2 RPM | Viscosity (cp) @ 20 RPM | Thixotropic Index |
|---|---|---|---|
| 1 | 20700 | 5100 | 4.06 |
| 2a | 17500 | 4370 | 4.00 |
| 2b | 28800 | 6150 | 4.68 |
| Comparative Example 1 | 10200 | 3230 | 3.16 |

The thickening effect (2 RPM) of the formulation produced with the material from Example 1, 2a, and 2b, was 2.8, 1.7, and 2.0 times greater than that of the comparative example respectively. The thixotropic index of the samples prepared from the silica described in Example 1, 2a, and 2b were also all significantly superior to that of the comparative example. The formulation prepared with the silica from Example 2b was the best, providing a TI about 1.5 times higher than the comparative example.

Numerous modifications and variations on the present invention are possible in light of the above teachings. It is therefore to be understood that within the scope of the appended claims, the invention may be practiced otherwise than as specifically described herein.

The invention claimed is:

1. A precipitated silica having the following properties:
   a $d_{50}$-value of from 150 to 2000 nm;
   a $d_{90}$-value of from 500 to 7000 nm;
   a silanol group density of from 2.5 to 8 OH/nm$^2$; and
   a modified tapped density of less than or equal to 70 g/l.

2. The precipitated silica according to claim 1, wherein a surface of the precipitated silica is doped with at least one bivalent cation selected from the group consisting of $Mg^{2+}$, $Ca^{2+}$, $Ba^{2+}$, $Sr^{2+}$, $Zn^{2+}$ and mixtures thereof.

3. The precipitated silica according to claim 1, wherein a BET-surface area of the precipitated silica is from 100 to 350 m$^2$/g.

4. The precipitated silica according to claim 1, wherein a loss on drying is from 1.5 to 8% by weight and/or a loss on ignition is from 1.5 to 9% by weight.

5. The precipitated silica according to claim 1, wherein the silanol group density is from 3.1 to 5 OH/nm$^2$.

6. The precipitated silica according to claim 1, wherein a pH-value is from 4 to 9.

7. The precipitated silica according to claim 1, wherein a $SiOH_{isolated}$-absorbance ratio is below 0.8.

8. A liquid composition, comprising:
   at least one precipitated silica according to claim 1.

9. The liquid composition according to claim 8, which comprises a cured or uncured unsaturated polyester resin composition.

10. The liquid composition according to claim 8, which is a colored composition.

11. The liquid composition according to claim 8, comprising 0.1 to 15% by weight of said precipitated silica.

12. A process for applying a liquid composition, comprising:
   applying the liquid composition of claim 8 to an article, followed by curing.

13. An article coated with a liquid composition according to claim 8.

14. A process for manufacture of a liquid composition, comprising:
   combining at least one precipitated silica according to claim 1 with at least one polymer compound.

15. A process for manufacture of a precipitated silica, comprising:
   milling and simultaneously classifying a first precipitated silica having the following properties:
   a Sears number of from 10 to 30 ml/(5 g),
   a BET-surface area of from 100 to 350 m$^2$/g,
   a loss on drying of from 2 to 8% by weight,
   a loss on ignition of from 2 to 9% by weight,
   a pH-value of from 4 to 9, and
   a DBP-value of from 230 to 400 g/100 g,
   to obtain a second precipitated silica;
   said milling and simultaneously classifying being performed using a grinding apparatus;

wherein a mill of the grinding apparatus is operated in a grinding phase with an operational medium selected from the group consisting of a gas, a vapor, steam, a gas comprising steam and mixtures thereof; and wherein a grinding chamber is heated in a heating phase, before an actual operation with the operational medium, such that a temperature in the grinding chamber and/or at a mill outlet is higher than a dew point of the operational medium; and wherein said second precipitated silica is classified to a $d_{50}$-value of from 150-2000 nm and a and has a silanol group density of from 2.5 to 8 OH/nm$^2$; and a modified tapped density of less than or equal to 70 g/l.

16. The process according to claim 15, wherein said grinding apparatus comprises a jet mill.

17. The process according to claim 16, wherein said jet mill is a fluid-bed opposed-jet mill which is operated with steam as operational medium.

18. The process according to claim 16, further comprising contacting the first precipitated silica with at least one multivalent cation and/or NH$_3$.

19. The process according to claim 18, wherein the cation is a bivalent cation or a trivalent cation.

20. The process according to claim 18, wherein the cation is selected from the group consisting of Mg$^{2+}$, Ca$^{2+}$, Ba$^{2+}$, Sr$^{2+}$ and Zn$^{2+}$, Al$^{3+}$ and mixtures thereof.

21. The process according to claim 15, wherein said operational medium is steam.

22. The process according to claim 15, wherein said grinding apparatus comprises a fluid-bed opposed-jet mill.

* * * * *